US012044832B1

(12) United States Patent
Kelly

(10) Patent No.: US 12,044,832 B1
(45) Date of Patent: Jul. 23, 2024

(54) ANAMORPHIC OPTICAL SYSTEM

(71) Applicant: PANAMORPH, INC., Colorado Springs, CO (US)

(72) Inventor: Shawn L. Kelly, Colorado Springs, CO (US)

(73) Assignee: PANAMORPH, INC., Colorado Springs, CO (US)

(*) Notice: Subject to any disclaimer, the term of this patent is extended or adjusted under 35 U.S.C. 154(b) by 220 days.

(21) Appl. No.: 17/498,684

(22) Filed: Oct. 11, 2021

Related U.S. Application Data

(60) Provisional application No. 63/090,277, filed on Oct. 11, 2020.

(51) Int. Cl.
*G02B 13/10* (2006.01)
*G02B 13/16* (2006.01)
*G03B 21/14* (2006.01)

(52) U.S. Cl.
CPC ............. *G02B 13/10* (2013.01); *G02B 13/16* (2013.01); *G03B 21/142* (2013.01)

(58) Field of Classification Search
CPC ........ G02B 13/10; G02B 13/16; G02B 13/08; G02B 27/09; G02B 27/0927; G02B 13/12; G02B 26/08; G02B 5/18; G02B 26/10; G02B 26/101; G02B 27/102; G02B 27/104; G02B 27/108; G02B 27/1086; G02B 27/145; G02B 27/42; G02B 27/4227; G02B 26/106; G02B 27/1006; G02B 27/0025; G02B 27/01; G02B 27/62; G02B 26/105; G02B 27/0031; G02B 21/142; G03B 21/142; G03B 21/14; B02B 13/12; H04N 9/3129; H04N 9/3185

USPC ............ 359/201.1, 201.2, 202.2, 662, 205.1, 359/206.1, 207.1, 207.2, 207.3, 207.4, 359/207.5, 207.8, 69, 70, 668, 669, 670,
(Continued)

(56) References Cited

U.S. PATENT DOCUMENTS

| 2,307,210 A | 1/1943 | Goldsmith |
| 2,780,142 A | 2/1957 | Bouwers |

(Continued)

OTHER PUBLICATIONS

M Hart, "Solving the Mysteries of MGM Camera 65 and Ultra Panavision 70" Reprinted from Wide Gage File and Video Monthly, Marshall Multimedia, L.L.C., vol. 1, No. 7, 1996, Revised Aug. and Dec. 1997 and Sep. 2002, Internet Document printed on Jan. 29, 2022 from http://www.widescreenmuseum.com/widescreenj/c65story.htm, 3 pages.

(Continued)

*Primary Examiner* — Jie Lei
*Assistant Examiner* — Kuei-Jen L Edenfield
(74) *Attorney, Agent, or Firm* — Kurt L. VanVoorhies

(57) ABSTRACT

A pair of optical prisms arranged in a complementary relationship provides for anamorphic magnification and cooperates with a refractive or diffractive element having at least one axis of effective cylindrical curvature, wherein each at least one axis of effective cylindrical curvature and the apexes of the pair of optical prisms are all substantially parallel to one another. The refractive or diffractive element generates an aberration as a result of rotation thereof about an axis parallel to the at least one axis of effective cylindrical curvature that at least partially compensates a corresponding aberration generated by the pair of optical prisms.

42 Claims, 26 Drawing Sheets

(58) Field of Classification Search
USPC .......... 359/671, 737, 831, 832, 837; 353/81, 353/122
See application file for complete search history.

(56) References Cited

U.S. PATENT DOCUMENTS

| | | | |
|---|---|---|---|
| 3,006,241 A | 10/1961 | Marks et al. | |
| 3,637,308 A * | 1/1972 | Van Raalte | G02B 13/10 |
| | | | 359/615 |
| 3,832,046 A | 8/1974 | Mecklenborg | |
| 4,017,160 A | 4/1977 | Betensky | |
| 4,129,365 A | 12/1978 | Aversano et al. | |
| 4,173,399 A | 11/1979 | Yevick | |
| 4,327,968 A | 5/1982 | Yevick | |
| 4,913,528 A | 4/1990 | Hasegawa | |
| 4,953,956 A | 9/1990 | Carpenter | |
| 5,159,491 A | 10/1992 | Richards | |
| 5,373,395 A | 12/1994 | Adachi | |
| 5,596,456 A | 1/1997 | Luecke | |
| 5,610,771 A | 3/1997 | Sigler | |
| 5,636,069 A | 6/1997 | Nightingale et al. | |
| 5,862,001 A | 1/1999 | Sigler | |
| 6,038,089 A | 3/2000 | Maruyama et al. | |
| 6,128,119 A | 10/2000 | Kamikubo | |
| 6,212,022 B1 | 4/2001 | Kamikubo | |
| 6,678,095 B2 | 1/2004 | Kelly | |
| 6,964,484 B2 | 11/2005 | Gupta et al. | |
| 7,289,272 B2 | 10/2007 | Bowron et al. | |
| 7,375,868 B2 | 5/2008 | Park et al. | |
| 7,995,282 B2 | 8/2011 | Kelly | |
| 8,585,210 B2 * | 11/2013 | Cheng | G02B 26/0883 |
| | | | 359/669 |
| 9,891,430 B2 * | 2/2018 | Hung | G02B 26/0833 |
| 2010/0321789 A1 * | 12/2010 | Kelly | G03B 5/00 |
| | | | 359/669 |
| 2012/0300276 A1 * | 11/2012 | Ohnishi | G02B 27/0031 |
| | | | 359/205.1 |

OTHER PUBLICATIONS

MGM Camera 65 Ultra Panavision: Internet Document printed on Jan. 29, 2022 (Previously printed on Nov. 24, 2001) from http://www.widescreenmuseum.com/widescreenj/wingup1.htm, 3 pages.
MGM Camera 65 Ultra Panavision: Internet Document printed on Jan. 29, 2022 (Previously printed on Nov. 24, 2001) from http://www.widescreenmuseum.com/widescreenj/wingup2.htm, 6 pages.
MGM Camera 65 Ultra Panavision: Internet Document printed on Jan. 29, 2022 (Previously printed on Nov. 24, 2001) from http://www.widescreenmuseum.com/widescreenj/wingup3.htm, 4 pages.
MGM Camera 65 Ultra Panavision: Internet Document printed on Jan. 29, 2022 (Previously printed on Nov. 24, 2001) from http://www.widescreenmuseum.com/widscreenj/wingup4.htm, 3 pages.
MGM Camera 65 Ultra Panavision: Internet Document printed on Jan. 29, 2022 (Previously printed on Nov. 24, 2001) from http://www.widescreenmuseum.com/widescreenj/wingup5.htm, 3 pages.

* cited by examiner

Values in mm

FIG. 7

| Spot ID | Object Space X | Object Space Y |
|---|---|---|
| A, A' | 0 | 0 |
| B, B' | 10 | -14 |
| C, C' | -10 | -14 |
| D, D' | 31 | 0 |
| E, E' | -31 | 0 |
| F, F' | 20 | -28 |
| G, G' | 31 | -39 |
| H, H' | -31 | -39 |

UNCORRECTED IMAGE

| | FIG. 11a Image Space - Red | | FIG. 11b Image Space - Green | | FIG. 11c Image Space - Blue | | Image Average | |
|---|---|---|---|---|---|---|---|---|
| Spot ID | X | Y | X | Y | X | Y | X | Y |
| A, A' | 0.0 | 351.6 | 0.0 | 352.3 | 0.0 | 353.7 | 0.0 | 352.5 |
| B, B' | -590.4 | 965.6 | -590.4 | 965.6 | -590.4 | 965.6 | -590.4 | 965.6 |
| C, C' | 590.4 | 965.6 | 590.4 | 965.6 | 590.4 | 965.6 | 590.4 | 965.6 |
| D, D' | -1826.3 | 361.3 | -1826.3 | 361.9 | -1826.3 | 363.2 | -1826.3 | 362.1 |
| E, E' | 1826.3 | 361.4 | 1826.3 | 361.9 | 1826.3 | 363.2 | 1826.3 | 362.2 |
| F, F' | -1174.3 | 1594.3 | -1174.2 | 1593.6 | -1174.1 | 1592.0 | -1174.2 | 1593.3 |
| G, G' | -1802.4 | 2071.9 | -1802.3 | 2070.5 | -1802.0 | 2067.4 | -1802.2 | 2070.0 |
| H, H' | 1802.4 | 2071.9 | 1802.3 | 2070.5 | 1802.0 | 2067.4 | 1802.2 | 2069.9 |

Values in μm

| | Image Space - Red Airy Radius 98.1 | | Image Space - Green 87.9 | | Image Space - Blue 72.7 | |
|---|---|---|---|---|---|---|
| Spot ID | RMS | GEO | RMS | GEO | RMS | GEO |
| A' | 7009.9 | 13000.0 | 7034.3 | 13000.0 | 7089.0 | 13000.0 |
| B' | 5841.3 | 11000.0 | 5864.2 | 11000.0 | 5915.7 | 11000.0 |
| C' | 5852.1 | 11000.0 | 5875.1 | 11000.0 | 5926.6 | 11000.0 |
| D' | 7395.9 | 14000.0 | 7421.3 | 14000.0 | 7478.4 | 14000.0 |
| E' | 7384.3 | 14000.0 | 7409.7 | 14000.0 | 7466.7 | 14000.0 |
| F' | 5633.2 | 11000.0 | 5656.7 | 11000.0 | 5709.8 | 11000.0 |
| G' | 6049.2 | 12000.0 | 6074.8 | 12000.0 | 6132.5 | 12000.0 |
| H' | 6037.3 | 12000.0 | 6062.9 | 12000.0 | 6120.5 | 12000.0 |

FIG. 9a

Values in mm

| Spot ID | Object Space FIG. 7 | | UNCORRECTED IMAGE WITH BEST FOCUS | | | | | | Image Average | |
|---|---|---|---|---|---|---|---|---|---|---|
| | | | Image Space - Red FIG. 12a | | Image Space - Green FIG. 12b | | Image Space - Blue FIG. 12c | | | |
| | X | Y | X | Y | X | Y | X | Y | X | Y |
| A, A' | 0 | 0 | 0.0 | 350.0 | 0.0 | 350.6 | 0.0 | 352.0 | 0.0 | 350.9 |
| B, B' | 10 | -14 | -590.4 | 963.8 | -590.4 | 963.8 | -590.4 | 963.8 | -590.4 | 963.8 |
| C, C' | -10 | -14 | 590.4 | 963.9 | 590.4 | 963.8 | 590.4 | 963.8 | 590.4 | 963.8 |
| D, D' | 31 | 0 | -1826.3 | 359.7 | -1826.3 | 360.3 | -1826.3 | 361.6 | -1826.3 | 360.5 |
| E, E' | -31 | 0 | 1826.3 | 359.7 | 1826.3 | 360.3 | 1826.3 | 361.6 | 1826.3 | 360.5 |
| F, F' | 20 | -28 | -1174.3 | 1592.6 | -1174.3 | 1591.8 | -1174.2 | 1590.2 | -1174.2 | 1591.5 |
| G, G' | 31 | -39 | -1802.5 | 2070.2 | -1802.4 | 2068.8 | -1802.0 | 2065.7 | -1802.3 | 2068.2 |
| H, H' | -31 | -39 | 1802.5 | 2070.2 | 1802.3 | 2068.8 | 1802.0 | 2065.7 | 1802.3 | 2068.2 |

Values in μm

| Spot ID | Image Space - Red Airy Radius 84.2 | | Image Space - Green 75.4 | | Image Space - Blue 62.4 | |
|---|---|---|---|---|---|---|
| | RMS | GEO | RMS | GEO | RMS | GEO |
| A' | 6238.7 | 11000.0 | 6262.6 | 11000.0 | 6316.2 | 11000.0 |
| B' | 5129.8 | 8567.7 | 5151.2 | 8613.3 | 5199.5 | 8715.6 |
| C' | 5133.4 | 8637.0 | 5154.9 | 8683.3 | 5203.3 | 8787.5 |
| D' | 6617.9 | 12000.0 | 6642.9 | 12000.0 | 6699.1 | 12000.0 |
| E' | 6614.0 | 12000.0 | 6638.9 | 12000.0 | 6695.1 | 12000.0 |
| F' | 4901.3 | 8216.5 | 4923.2 | 8264.1 | 4972.5 | 8371.1 |
| G' | 5261.2 | 9129.8 | 5285.6 | 9181.7 | 5340.7 | 9298.5 |
| H' | 5252.5 | 9157.4 | 5276.9 | 9209.3 | 5331.8 | 9326.1 |

FIG. 9b

Values in mm

FIG. 7

| Spot ID | Object Space | |
|---|---|---|
| | X | Y |
| A, A' | 0 | 0 |
| B, B' | 10 | -14 |
| C, C' | -10 | -14 |
| D, D' | 31 | 0 |
| E, E' | -31 | 0 |
| F, F' | 20 | -28 |
| G, G' | 31 | -39 |
| H, H' | -31 | -39 |

CORRECTED IMAGE

| Spot ID | FIG. 13a Image Space - Red | | FIG. 13b Image Space - Green | | FIGS. 8 & 13c Image Space - Blue | | Image Average | |
|---|---|---|---|---|---|---|---|---|
| | X | Y | X | Y | X | Y | X | Y |
| A, A' | 0.0 | 346.1 | 0.0 | 346.8 | 0.0 | 348.1 | 0.0 | 347.0 |
| B, B' | -590.3 | 958.0 | -590.3 | 959.5 | -590.3 | 959.4 | -590.3 | 959.0 |
| C, C' | 590.3 | 959.5 | 590.3 | 959.5 | 590.3 | 959.4 | 590.3 | 959.4 |
| D, D' | -1826.2 | 355.5 | -1826.2 | 356.1 | -1826.2 | 357.3 | -1826.2 | 356.3 |
| E, E' | 1826.2 | 355.5 | 1826.2 | 356.1 | 1826.2 | 357.3 | 1826.2 | 356.3 |
| F, F' | -1173.9 | 1587.5 | -1173.9 | 1586.7 | -1173.8 | 1585.0 | -1173.9 | 1586.4 |
| G, G' | -1801.7 | 2064.3 | -1801.5 | 2062.9 | -1801.2 | 2059.7 | -1801.5 | 2062.3 |
| H, H' | 1801.7 | 2064.3 | 1801.5 | 2062.9 | 1801.2 | 2059.7 | 1801.5 | 2062.3 |

Values in μm
Airy Radius

| Spot ID | Image Space - Red 79.5 | | Image Space - Green 71.2 | | Image Space - Blue 58.9 | |
|---|---|---|---|---|---|---|
| | RMS | GEO | RMS | GEO | RMS | GEO |
| A' | 242.2 | 464.2 | 242.4 | 464.6 | 242.8 | 465.6 |
| B' | 336.4 | 606.5 | 336.1 | 606.8 | 335.4 | 607.3 |
| C' | 336.9 | 607.9 | 336.7 | 608.2 | 336.1 | 608.9 |
| D' | 313.4 | 597.7 | 312.9 | 596.7 | 311.8 | 594.5 |
| E' | 313.0 | 588.6 | 312.5 | 587.5 | 311.4 | 585.1 |
| F' | 265.3 | 572.4 | 264.2 | 570.5 | 261.6 | 565.8 |
| G' | 494.2 | 1032.9 | 499.7 | 1044.8 | 512.1 | 1071.9 |
| H' | 493.0 | 1031.8 | 498.4 | 1043.4 | 510.8 | 1069.8 |

FIG. 9c

86 — FIG. 7 Values in mm — Object Space

| Spot ID | X | Y |
|---|---|---|
| A, A' | 0 | 0 |
| B, B' | 10 | -14 |
| C, C' | -10 | -14 |
| D, D' | 31 | 0 |
| E, E' | -31 | 0 |
| F, F' | 20 | -28 |
| G, G' | 31 | -39 |
| H, H' | -31 | -39 |

88 — IMAGE WITH NON-OPTIMIZED BUT ROTATED CORRECTOR

| Spot ID | FIG. 14a Image Space - Red | | FIG. 14b Image Space - Green | | FIG. 14c Image Space - Blue | | Image Average | |
|---|---|---|---|---|---|---|---|---|
| | X | Y | X | Y | X | Y | X | Y |
| A, A' | 0.0 | 344.4 | 0.0 | 345.1 | 0.0 | 346.4 | 0.0 | 345.3 |
| B, B' | -590.2 | 958.0 | -590.2 | 958.0 | -590.2 | 967.9 | -590.2 | 961.3 |
| C, C' | 590.2 | 958.0 | 590.2 | 958.0 | 590.2 | 957.9 | 590.2 | 958.0 |
| D, D' | -1825.8 | 353.8 | -1825.8 | 354.4 | -1825.8 | 355.6 | -1825.8 | 354.6 |
| E, E' | 1825.8 | 353.8 | 1825.8 | 354.4 | 1825.8 | 355.6 | 1825.8 | 354.6 |
| F, F' | -1173.7 | 1586.2 | -1173.7 | 1585.5 | -1173.6 | 1583.8 | -1173.6 | 1585.2 |
| G, G' | -1801.4 | 2063.3 | -1801.2 | 2061.9 | -1800.9 | 2058.7 | -1801.2 | 2061.3 |
| H, H' | 1801.4 | 2063.3 | 1801.2 | 2061.9 | 1800.9 | 2058.7 | 1801.2 | 2061.3 |

88 — Values in μm, Airy Radius

| Spot ID | Image Space - Red 78.1 | | Image Space - Green 69.9 | | Image Space - Blue 57.9 | |
|---|---|---|---|---|---|---|
| | RMS | GEO | RMS | GEO | RMS | GEO |
| A' | 247.0 | 441.8 | 247.3 | 442.5 | 247.8 | 443.9 |
| B' | 303.1 | 529.2 | 302.1 | 526.6 | 299.6 | 521.6 |
| C' | 303.2 | 537.0 | 302.1 | 536.0 | 299.7 | 533.5 |
| D' | 319.4 | 736.2 | 318.4 | 734.0 | 316.2 | 729.0 |
| E' | 320.8 | 734.0 | 319.8 | 731.9 | 317.6 | 727.0 |
| F' | 285.5 | 537.7 | 289.6 | 547.0 | 299.1 | 568.3 |
| G' | 1019.7 | 2011.4 | 1028.5 | 2028.7 | 1048.6 | 2068.0 |
| H' | 1017.5 | 2031.4 | 1026.3 | 2048.9 | 1046.3 | 2088.5 |

UNCORRECTED IMAGE WITH BEST FOCUS

| Spot ID | R Size (GEO) | | G Size (GEO) | | B Size (GEO) | |
|---|---|---|---|---|---|---|
| GEO Relative To: | Uncorrected | | Uncorrected | | Uncorrected | |
| A' | 84.6% | | 84.6% | | 84.6% | |
| B' | 77.9% | | 78.3% | | 79.2% | |
| C' | 78.5% | | 78.9% | | 79.9% | |
| D' | 85.7% | | 85.7% | | 85.7% | |
| E' | 85.7% | | 85.7% | | 85.7% | |
| F' | 74.7% | | 75.1% | | 76.1% | |
| G' | 76.1% | | 76.5% | | 77.5% | |
| H' | 76.3% | | 76.7% | | 77.7% | |
| Max GEO: RGB | 85.7% | | 85.7% | | 85.7% | |
| Max: Uncorrected | | | 85.7% | | | |

FIG. 10b

CORRECTED IMAGE

| Spot ID | R Size (GEO) | | G Size (GEO) | | B Size (GEO) | |
|---|---|---|---|---|---|---|
| GEO Relative To: | Uncorrected | Best Focus | Uncorrected | Best Focus | Uncorrected | Best Focus |
| A' | 3.6% | 4.2% | 3.6% | 4.2% | 3.6% | 4.2% |
| B' | 5.5% | 7.1% | 5.5% | 7.0% | 5.5% | 7.0% |
| C' | 5.5% | 7.0% | 5.5% | 7.0% | 5.5% | 6.9% |
| D' | 4.3% | 5.0% | 4.3% | 5.0% | 4.2% | 5.0% |
| E' | 4.2% | 4.9% | 4.2% | 4.9% | 4.2% | 4.9% |
| F' | 5.2% | 7.0% | 5.2% | 6.9% | 5.1% | 6.8% |
| G' | 8.6% | 11.3% | 8.7% | 11.4% | 8.9% | 11.5% |
| H' | 8.6% | 11.3% | 8.7% | 11.3% | 8.9% | 11.5% |
| Max GEO: RGB | 8.6% | 11.3% | 8.7% | 11.4% | 8.9% | 11.5% |
| Max: Uncorrected | | | 8.9% | | | |
| Max: Best Focus | | | | | | 11.5% |

FIG. 10c

IMAGE WITH NON-OPTIMIZED BUT ROTATED CORRECTOR

| Spot ID | R Size (GEO) | | G Size (GEO) | | B Size (GEO) | |
|---|---|---|---|---|---|---|
| GEO Relative To: | Uncorrected | Best Focus | Uncorrected | Best Focus | Uncorrected | Best Focus |
| A' | 3.4% | 4.0% | 3.4% | 4.0% | 3.4% | 4.0% |
| B' | 4.8% | 6.2% | 4.8% | 6.1% | 4.7% | 6.0% |
| C' | 4.9% | 6.2% | 4.9% | 6.2% | 4.9% | 6.1% |
| D' | 5.3% | 6.1% | 5.2% | 6.1% | 5.2% | 6.1% |
| E' | 5.2% | 6.1% | 5.2% | 6.1% | 5.2% | 6.1% |
| F' | 4.9% | 6.5% | 5.0% | 6.6% | 5.2% | 6.8% |
| G' | 16.8% | 22.0% | 16.9% | 22.1% | 17.2% | 22.2% |
| H' | 16.9% | 22.2% | 17.1% | 22.2% | 17.4% | 22.4% |
| Max GEO: RGB | 16.9% | 22.2% | 17.1% | 22.2% | 17.4% | 22.4% |
| Max: Uncorrected | | | | | 17.4% | |
| Max: Best Focus | | | | | | 22.4% |

ANAMORPHIC OPTICAL SYSTEM

CROSS-REFERENCE TO RELATED APPLICATIONS

The instant application claims the benefit of prior U.S. Provisional Application Ser. No. 63/090,277 filed on 11 Oct. 2020, which is incorporated herein by reference in its entirety.

BRIEF DESCRIPTION OF THE DRAWINGS

Figure 6A:
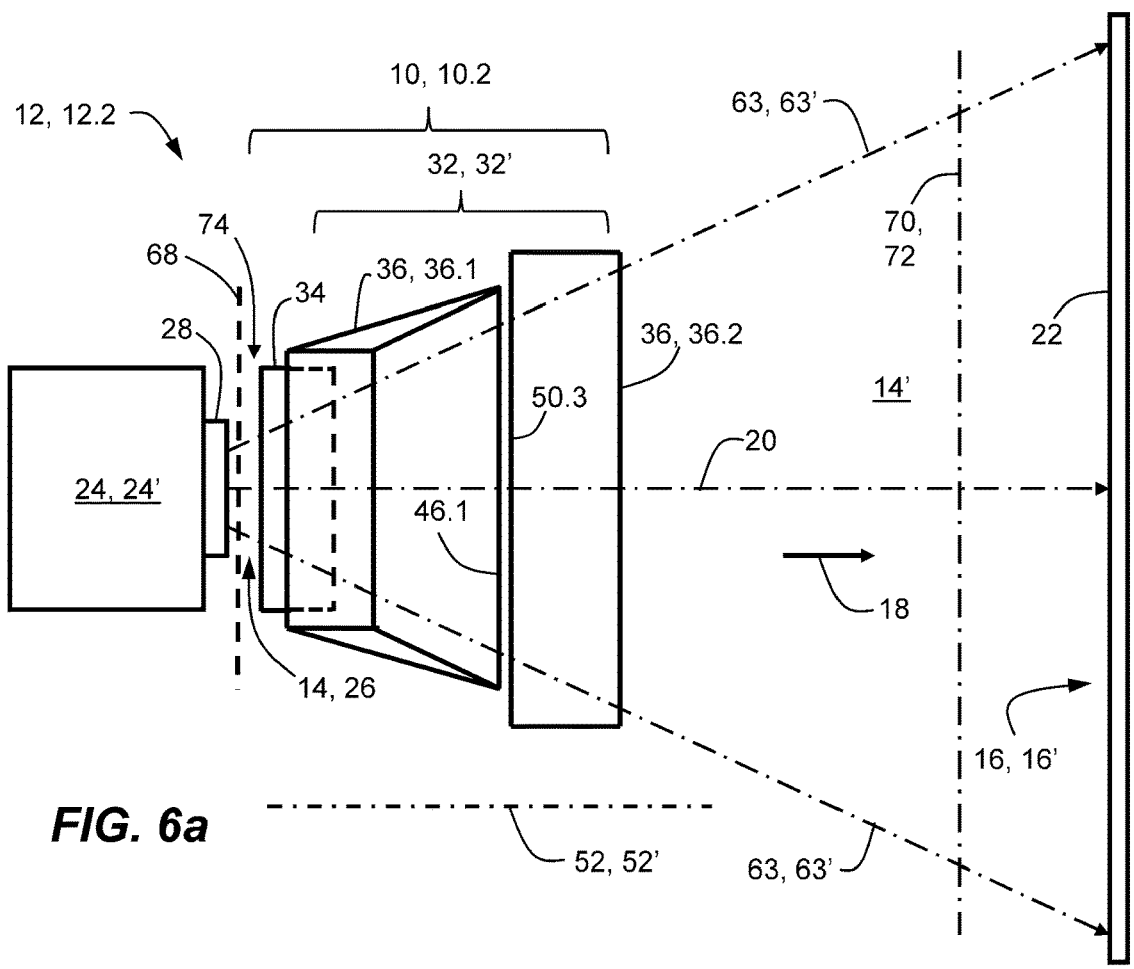
FIGS. 6a and 6b respectively illustrate top and side orthographic views of a schematic embodiment of a second aspect of an anamorphic optical system incorporated in an associated second-aspect image projection system being used to anamorphically magnify an image projected upwards onto a screen by an associated image projector, wherein the amount of anamorphic magnification in the vertical dimension is less than unity.
Figure 6B:
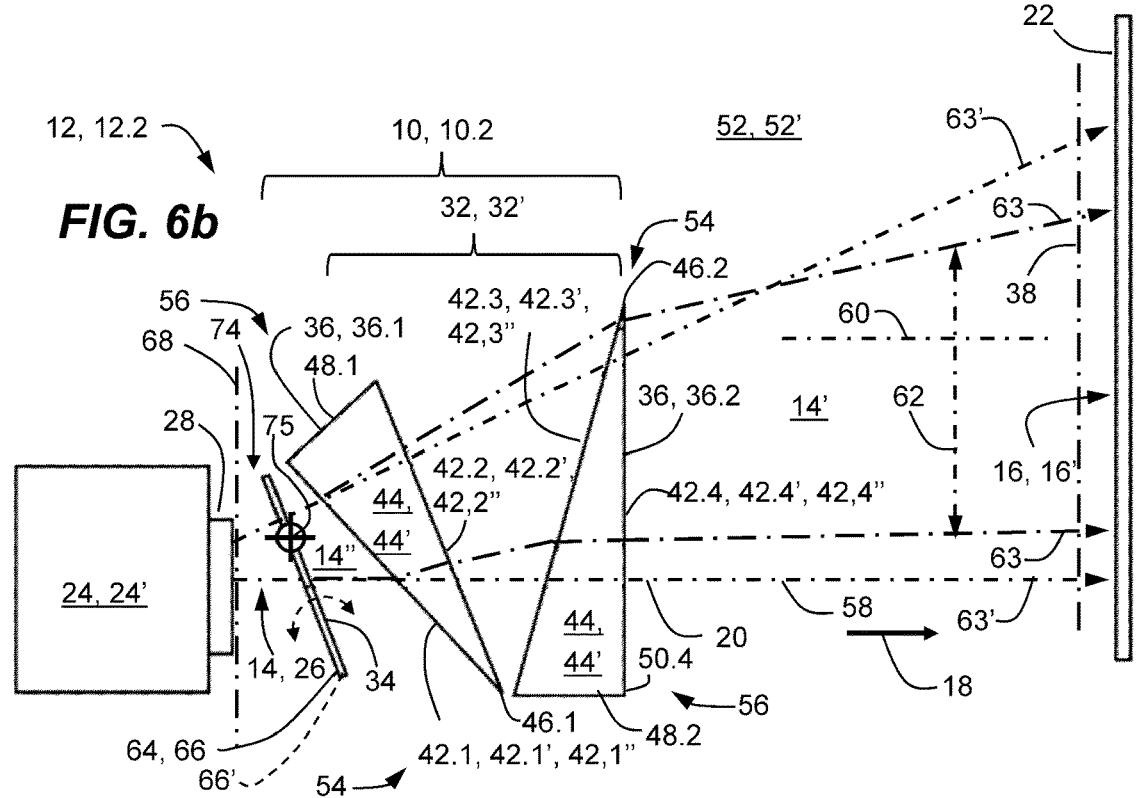
Figure 7:
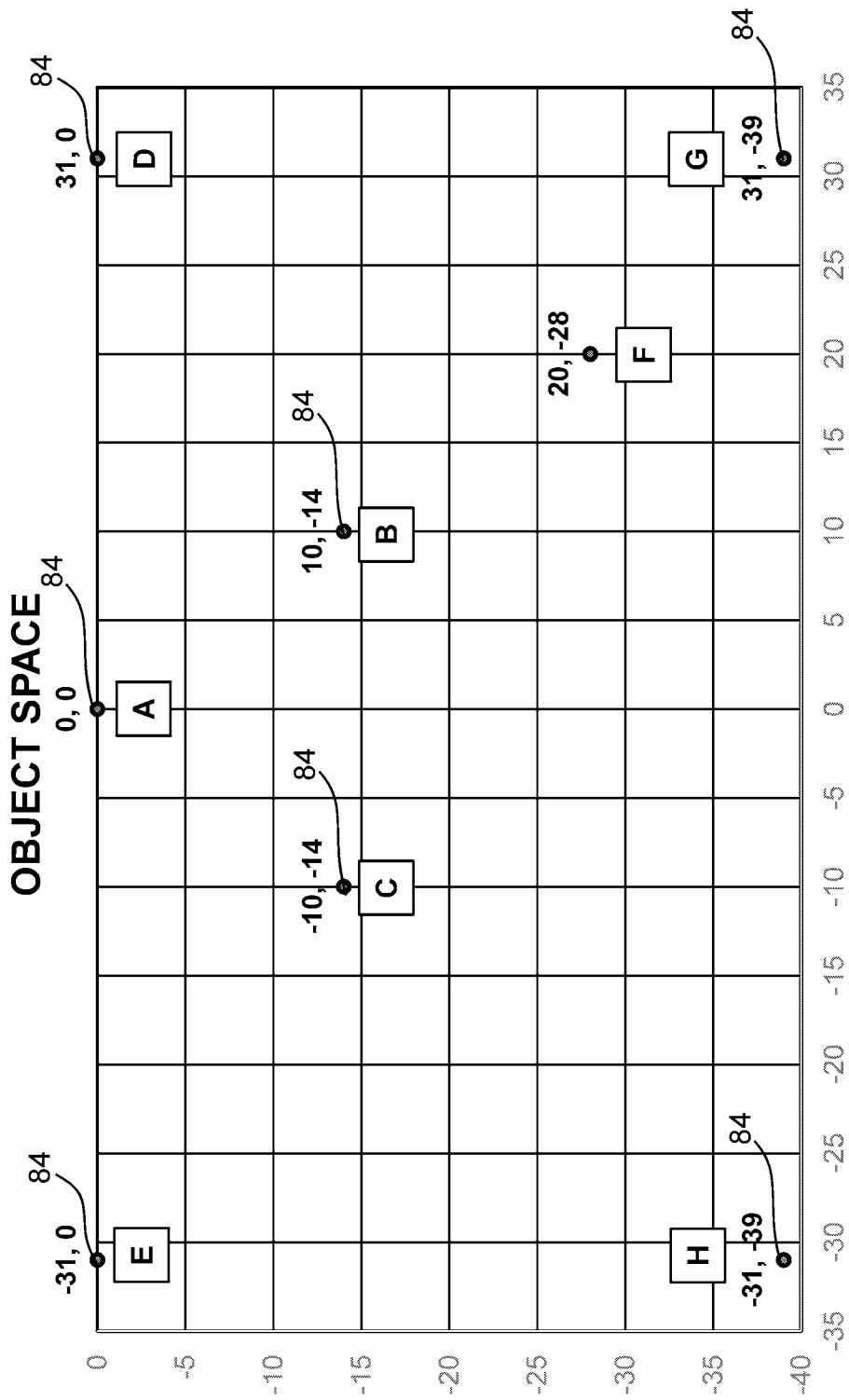
FIG. 7 illustrates the locations of a plurality of point-source objects used to simulate the performance of the anamorphic optical system illustrated in FIGS. 6a and 6b both without and with the associated corrector optics, associated with the results illustrated in FIGS. 9a through 14c.
Figure 8:
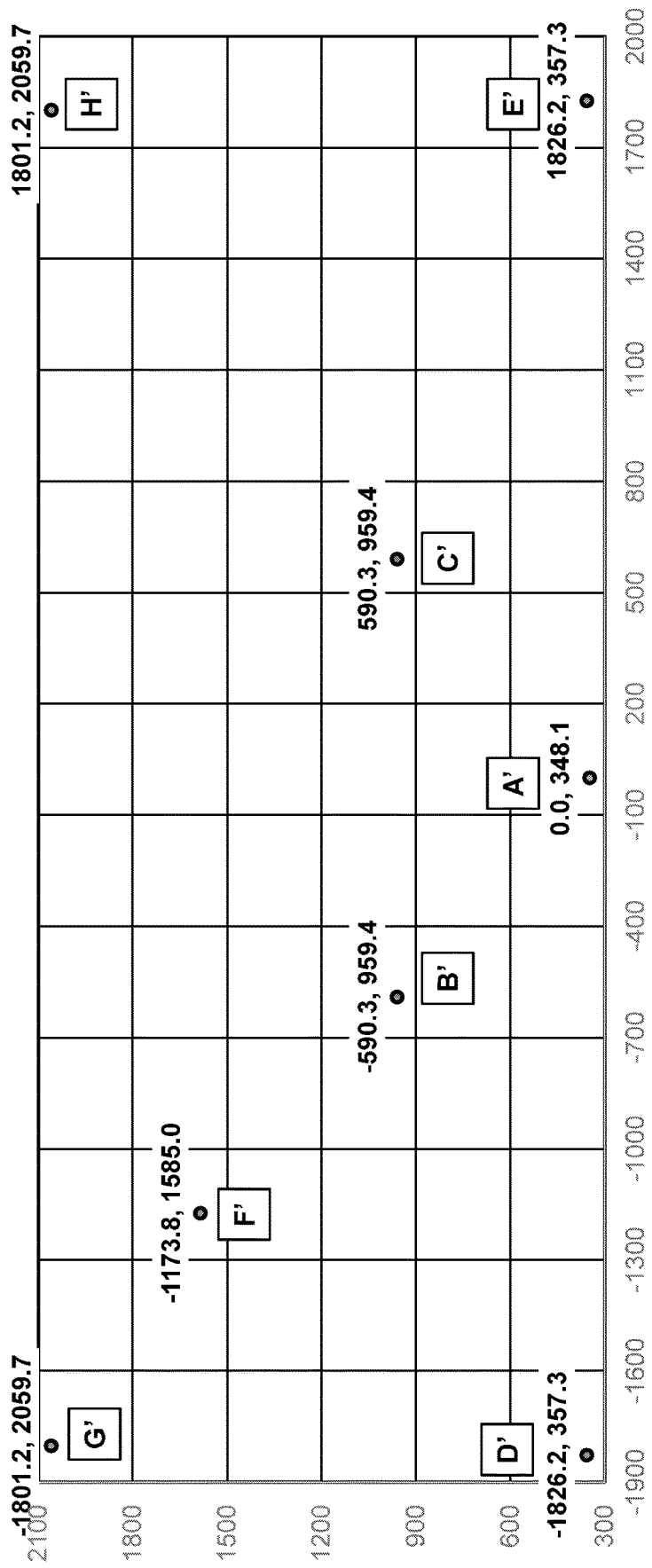
FIG. 8 illustrates the locations of corresponding images of the plurality of point-source objects used to simulate the performance of the optical system illustrated in FIGS. 6a and 6b both without and with the associated corrector optics, associated with the results illustrated in FIGS. 9a through 14c, associated with the corresponding locations illustrated in FIG. 7 of the corresponding associated point-source objects for the configuration associated with FIG. 13c.

In the accompanying drawings:

FIG. 9a illustrates a table of locations of the plurality of point-source objects and locations of corresponding associated images for each primary color—red, green and blue, —for associated uncorrected images that are respectively illustrated in FIGS. 11a-11c, for which the corrector optics of the associated anamorphic optical system are excluded and the associated image projection system is focused at one of the two associated astigmatism planes, and further illustrates average values of the associated image locations, for each of the eight point-source object locations labeled "A" through "H" as illustrated in FIG. 7, and for the corresponding eight image locations labeled "A" through "H" as illustrated in FIG. 8;

FIG. 9b illustrates a table of locations of the plurality of point-source objects and locations of corresponding associated images for each primary color—red, green and blue, —for associated uncorrected images that are respectively illustrated in FIGS. 12a-12c, for which the corrector optics of the associated anamorphic optical system are excluded and the associated image projection system is focused for minimum spot size, and further illustrates average values of the associated image locations, for each of the eight point-source object locations labeled "A" through "H" as illustrated in FIG. 7, and for the corresponding eight image locations labeled "A" through "H" as illustrated in FIG. 8;

FIG. 9c illustrates a table of locations of the plurality of point-source objects and locations of corresponding associated images for each primary color—red, green and blue, —for associated corrected images that are respectively illustrated in FIGS. 13a-13c, for which the corrector optics of the associated anamorphic optical system have been optimized for the associated distance between the image projector and the projection screen, and further illustrates average values of the associated image locations, for each of the eight point-source object locations labeled "A" through "H" as illustrated in FIG. 7, and for the corresponding eight image locations labeled "A" through "H" as illustrated in FIG. 8;

FIG. 9d illustrates a table of locations of the plurality of point-source objects and locations of corresponding associated images for each primary color—red, green and blue, —for associated non-optimally corrected images that are respectively illustrated in FIGS. 14a-14c, for which the corrector optics of the associated anamorphic optical system have been optimized for a distance between the image projector and the projection screen that is different from the corresponding distance that is simulated, but for which the corrector optics are rotated to provide for best focus, and further illustrates average values of the associated image locations, for each of the eight point-source object locations labeled "A" through "H" as illustrated in FIG. 7, and for the corresponding eight image locations labeled "A" through "H" as illustrated in FIG. 8;

FIG. 10a illustrates a table of ratios of the best-focus uncorrected GEO radii of FIG. 9b divided by corresponding values of the uncorrected GEO radii of FIG. 9a, expressed as percentages, so as to provide an indication of the relative size of the spot images of FIGS. 12a-12c in relation to the spot images of FIGS. 11a-11c, respectively;

FIG. 10b illustrates a table of ratios of the corrected GEO radii of FIG. 9c divided by corresponding values of the uncorrected GEO radii of FIG. 9a, and separately by the best-focus GEO radii of FIG. 9b, expressed as percentages, so as to provide an indication of the relative size of the spot images of FIGS. 13a-13c, in relation to the spot images of FIGS. 11a-11c, respectively, and separately in relation to the spot images of FIGS. 12a-12c, respectively;

FIG. 10c illustrates a table of ratios of the non-optimized-but-rotated-corrector GEO radii of FIG. 9d divided by corresponding values of the uncorrected GEO radii of FIG. 9a, and separately by the best-focus GEO radii of FIG. 9b, expressed as percentages, so as to provide an indication of the relative size of the spot images of FIGS. 14a-14c, in relation to the spot images of FIGS. 11a-11c, respectively, and separately in relation to the spot images of FIGS. 12a-12c, respectively;

FIGS. 11a-11c respectively illustrate uncorrected images for each primary color—red, green and blue, respectively— of a plurality of point-source objects at locations illustrated in FIG. 7, generated by the image projection system illustrated in FIGS. 6a and 6b, for which the corrector optics of the associated anamorphic optical system are excluded and the associated image projection system is focused at one of the two associated astigmatism planes, wherein the corresponding associated image locations are nominally illustrated in FIG. 8 and the corresponding locations of the images are tabulated in FIG. 9a;

Figure 12A:
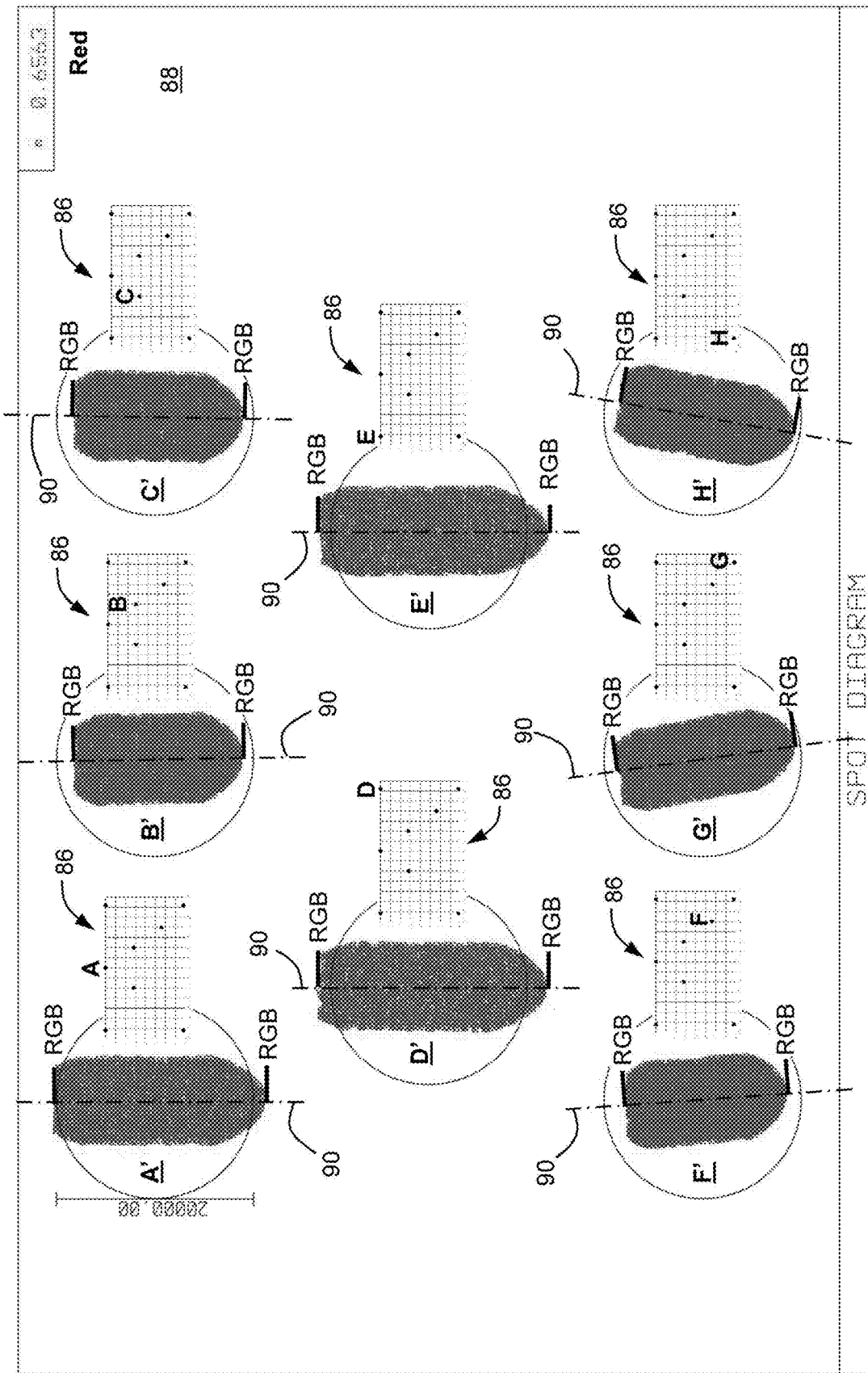
Figure 12B:
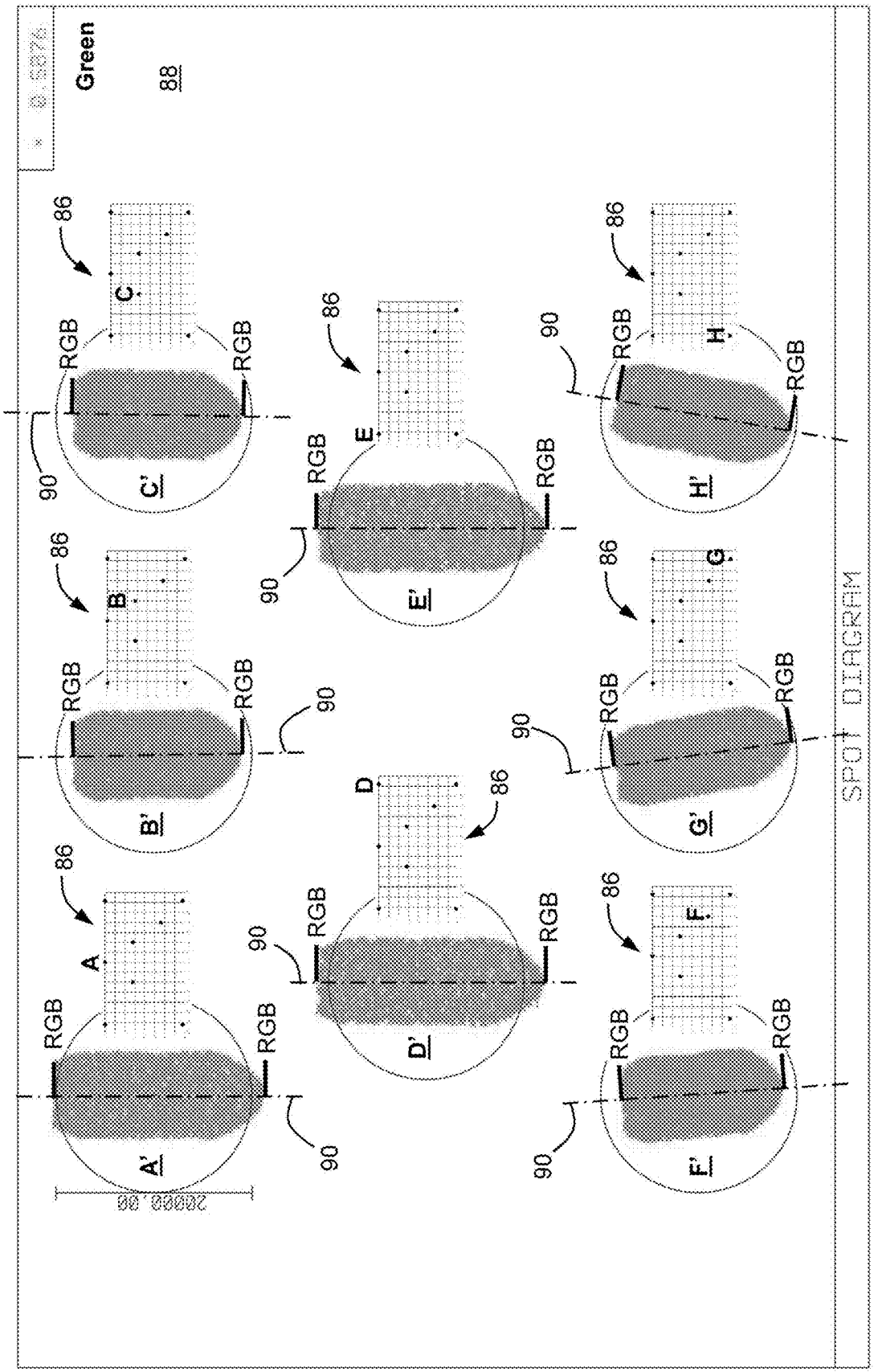
Figure 12C:
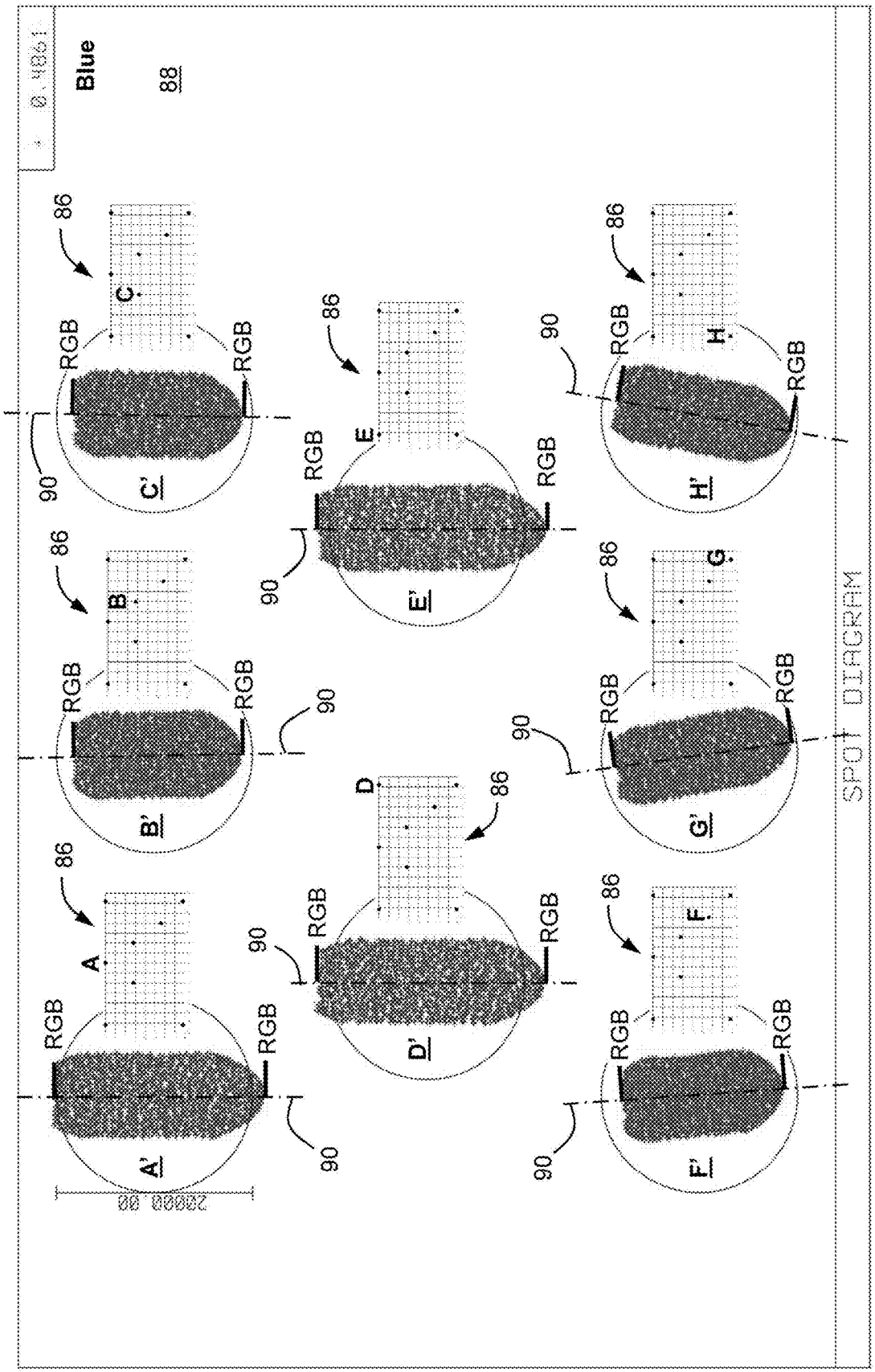
Figure 13A:
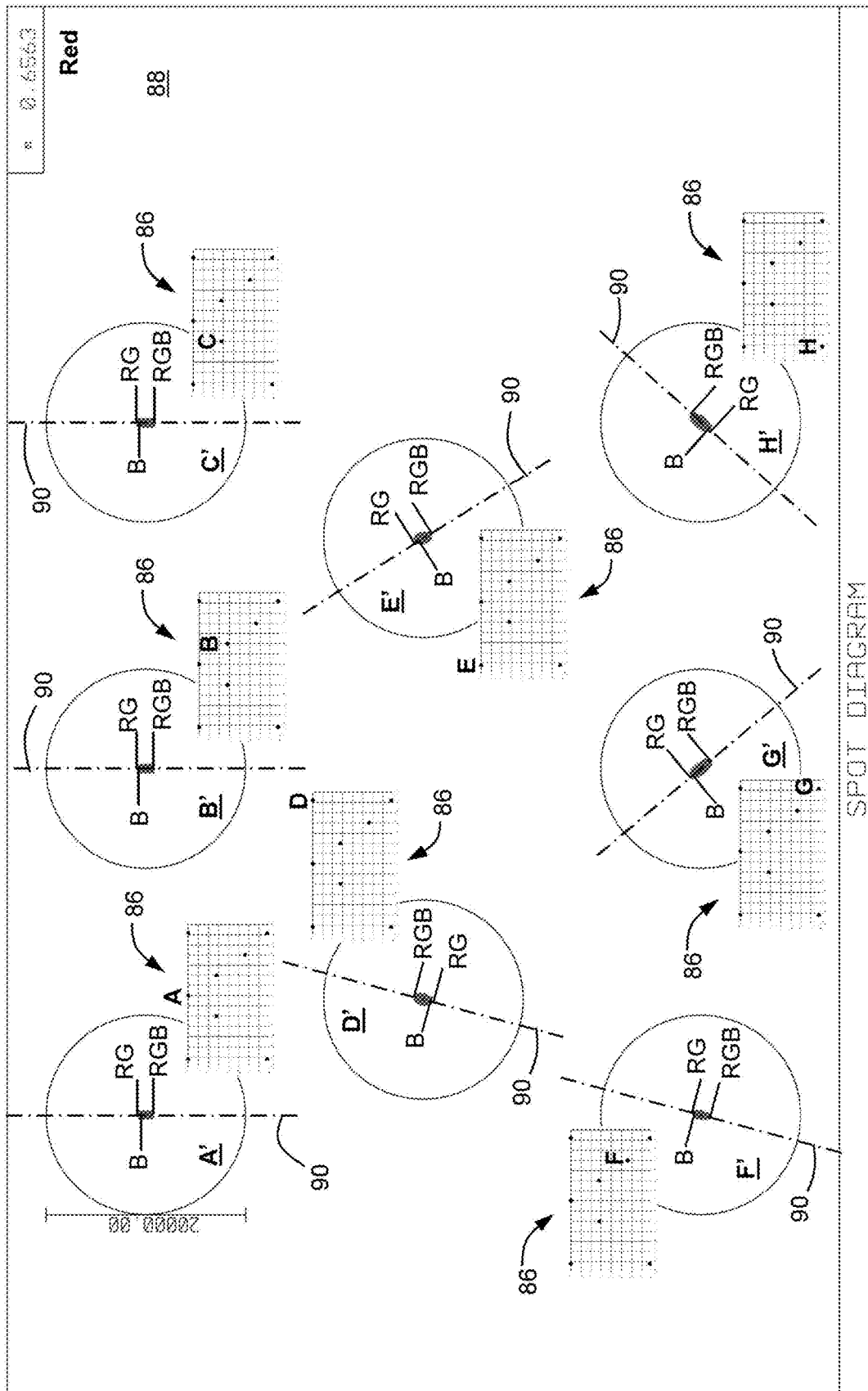
Figure 13B:
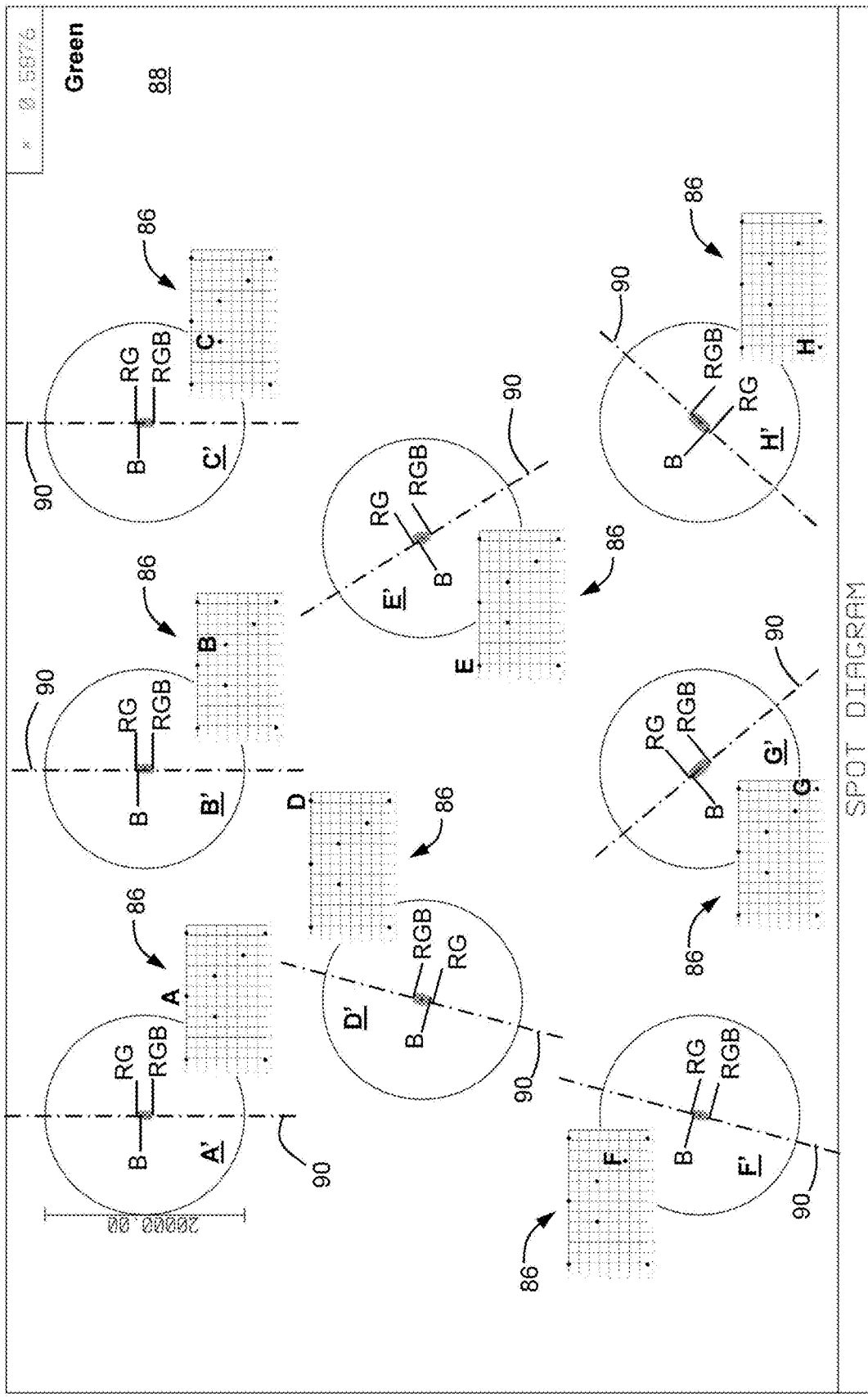
Figure 13C:
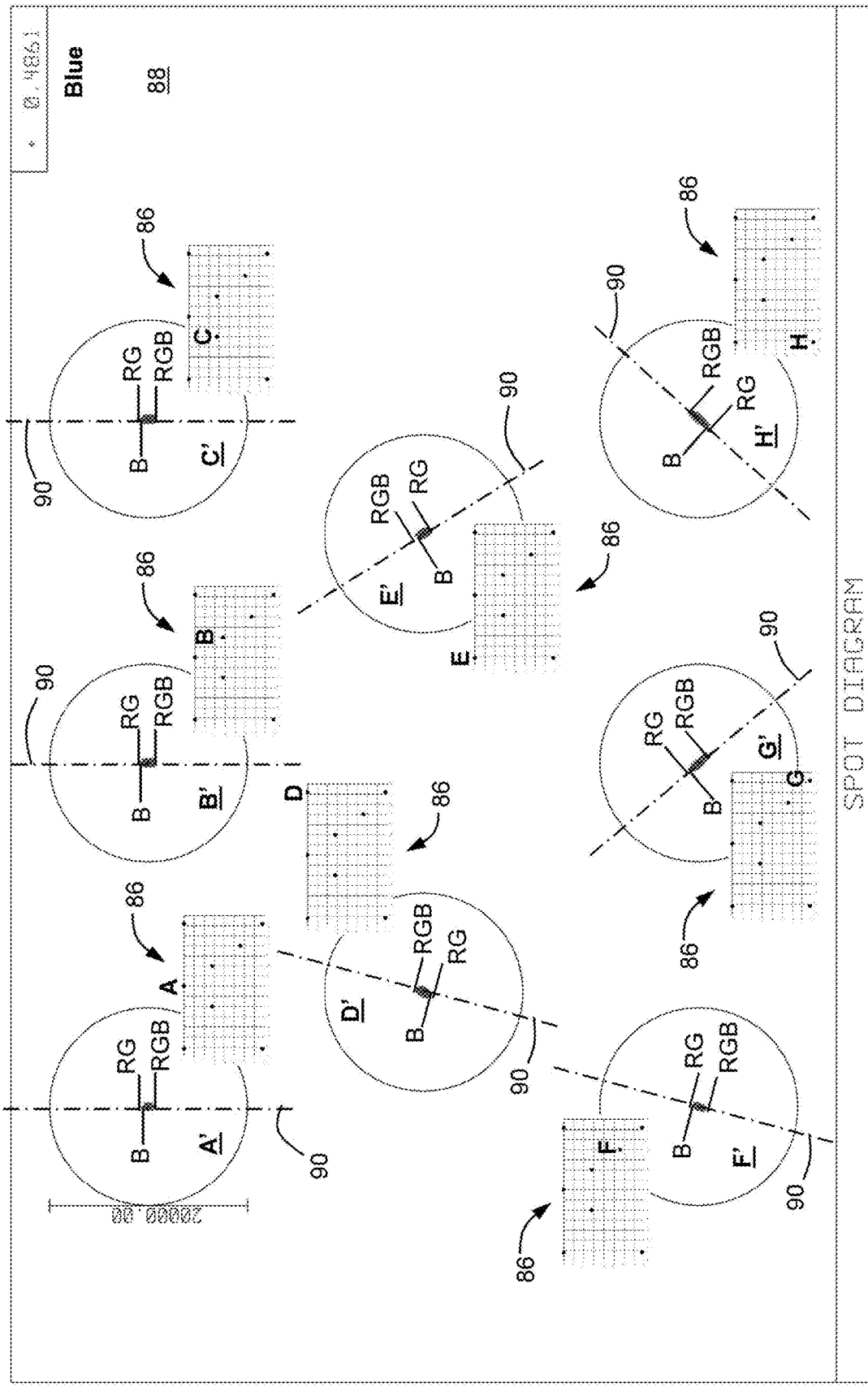
Figure 14A:
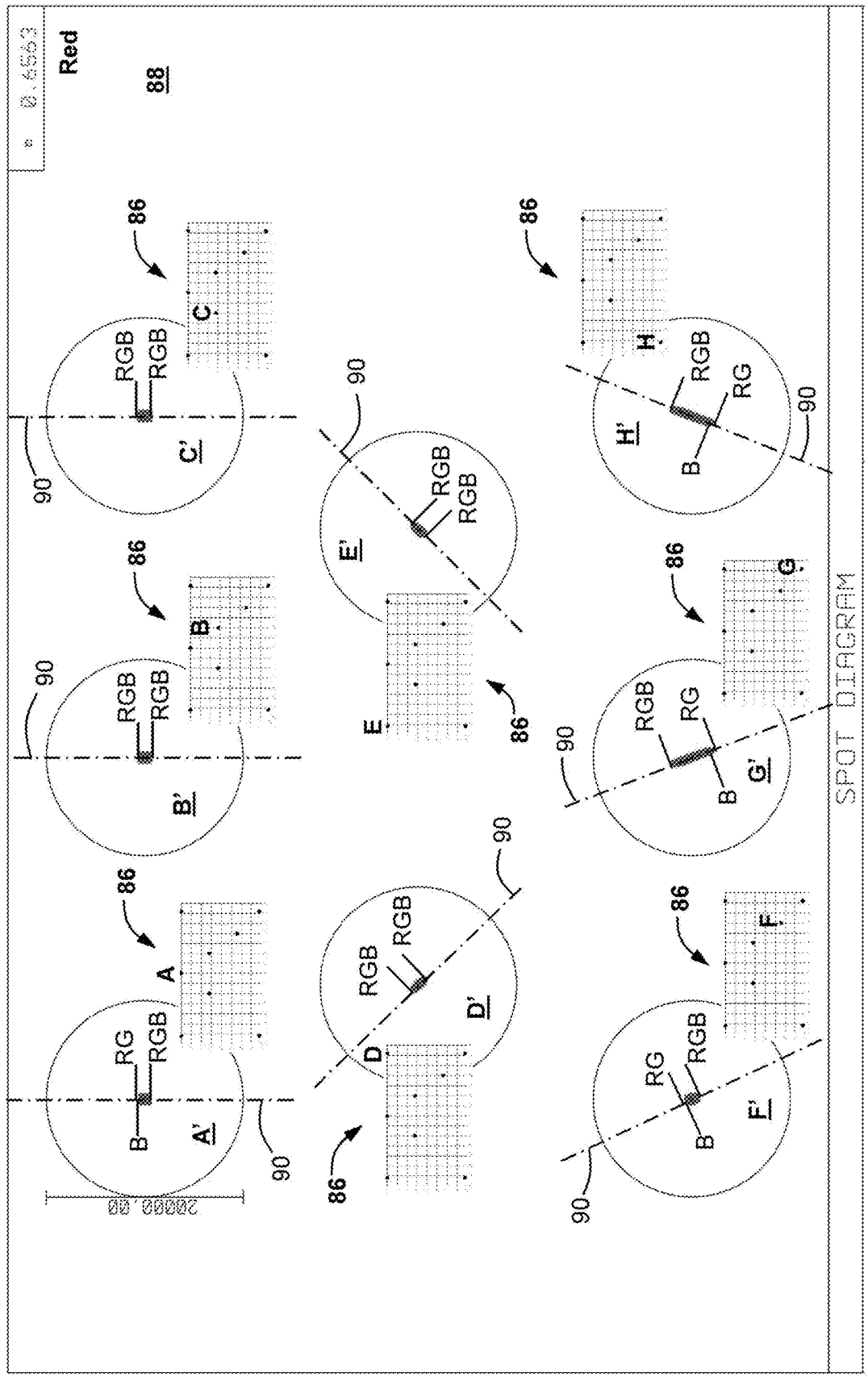
Figure 14B:
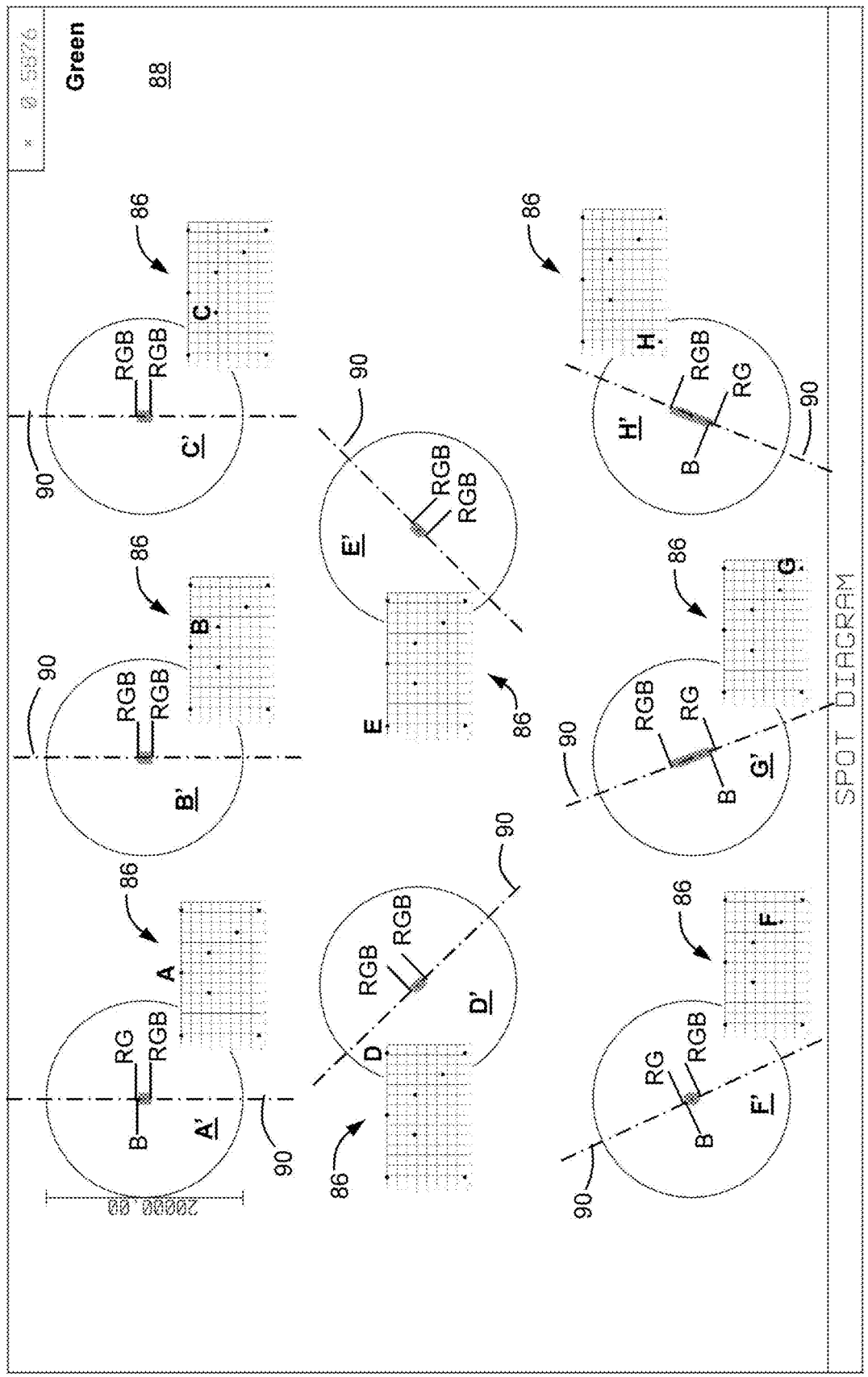
Figure 14C:
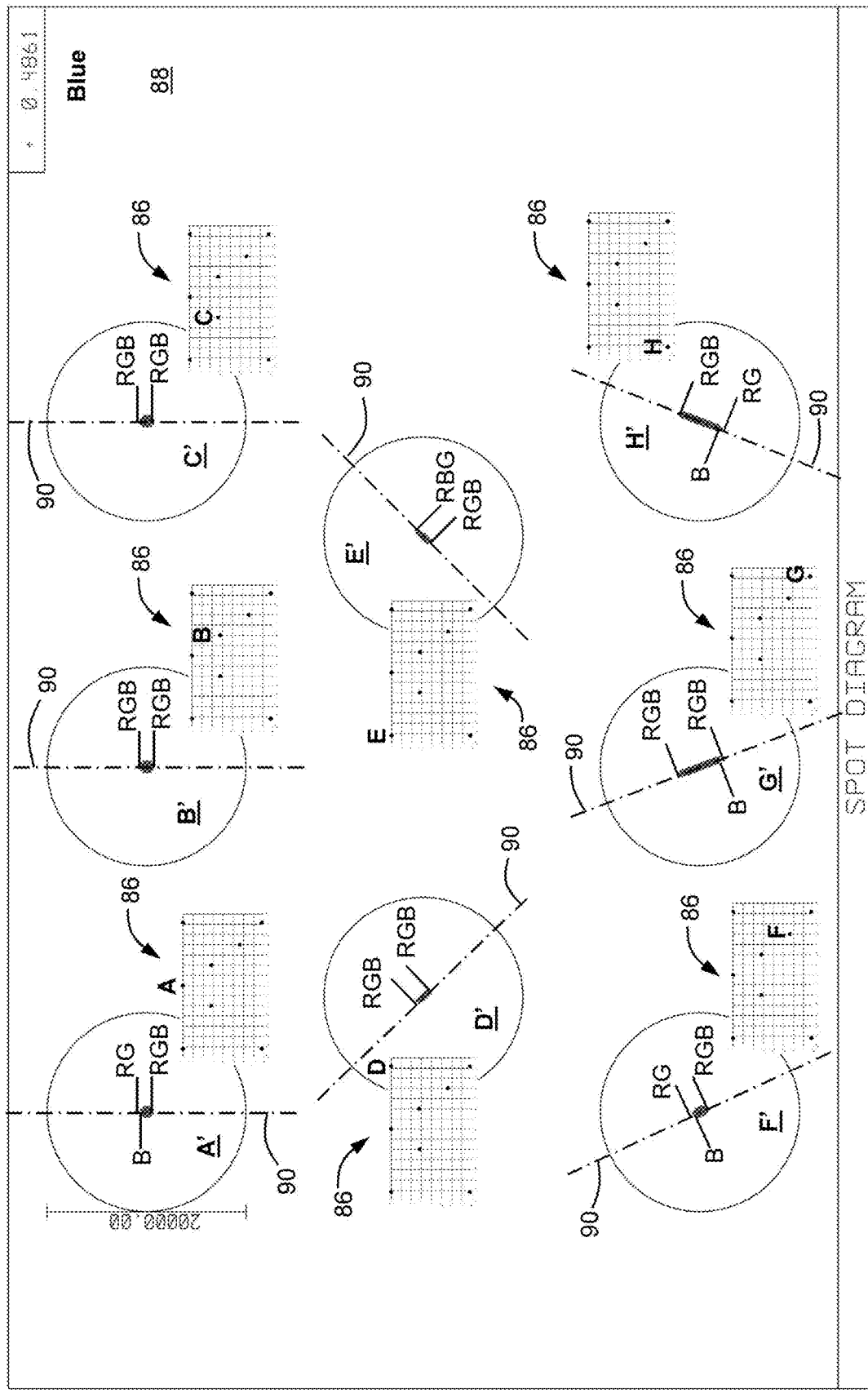

FIGS. 12a-12c respectively illustrate uncorrected images for each primary color—red, green and blue, respectively—of a plurality of point-source objects at locations illustrated in FIG. 7, generated by the image projection system illustrated in FIGS. 6a and 6b, for which the corrector optics of the associated anamorphic optical system are excluded and the associated image projection system is focused for minimum spot size, wherein the corresponding associated image locations are nominally illustrated in FIG. 8 and the corresponding locations of the images are tabulated in FIG. 9b;

FIGS. 13a-13c respectively illustrate corrected images for each primary color—red, green and blue, respectively—of a plurality of point-source objects at locations illustrated in FIG. 7, generated by the image projection system illustrated in FIGS. 6a and 6b, for which the corrector optics of the associated anamorphic optical system have been optimized for the associated distance between the image projector and the projection screen, wherein the corresponding associated image locations are nominally illustrated in FIG. 8 and the corresponding locations of the images are tabulated in FIG. 9c; and FIGS. 14a-14c respectively illustrate corrected images for each primary color—red, green and blue, respectively—of a plurality of point-source objects at locations illustrated in FIG. 7, generated by the image projection system illustrated in FIGS. 6a and 6b, for which the corrector optics of the associated anamorphic optical system have been optimized for a distance between the image projector and the projection screen that is different from the corresponding distance that is simulated, but for which the corrector optics are rotated to provide for best focus, wherein the corresponding associated image locations are nominally illustrated in FIG. 8 and the corresponding locations of the images are tabulated in FIG. 9d.

DESCRIPTION OF EMBODIMENT(S)

Figure 1A:
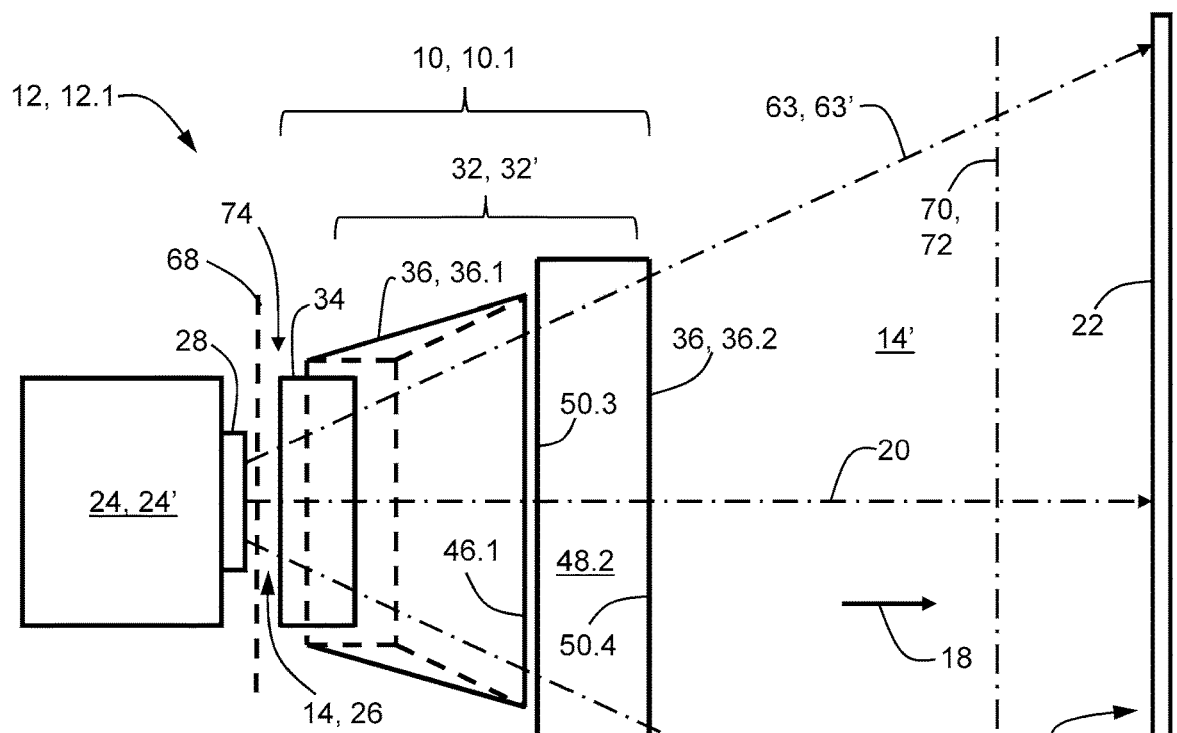
FIGS. 1a and 1b respectively illustrate top and side orthographic views of a schematic embodiment of a first aspect of an anamorphic optical system incorporated in an associated first-aspect image projection system being used to anamorphically magnify an image projected generally downwards onto a screen by an associated image projector, wherein the amount of anamorphic magnification in the vertical dimension is less than unity.
Figure 1B:
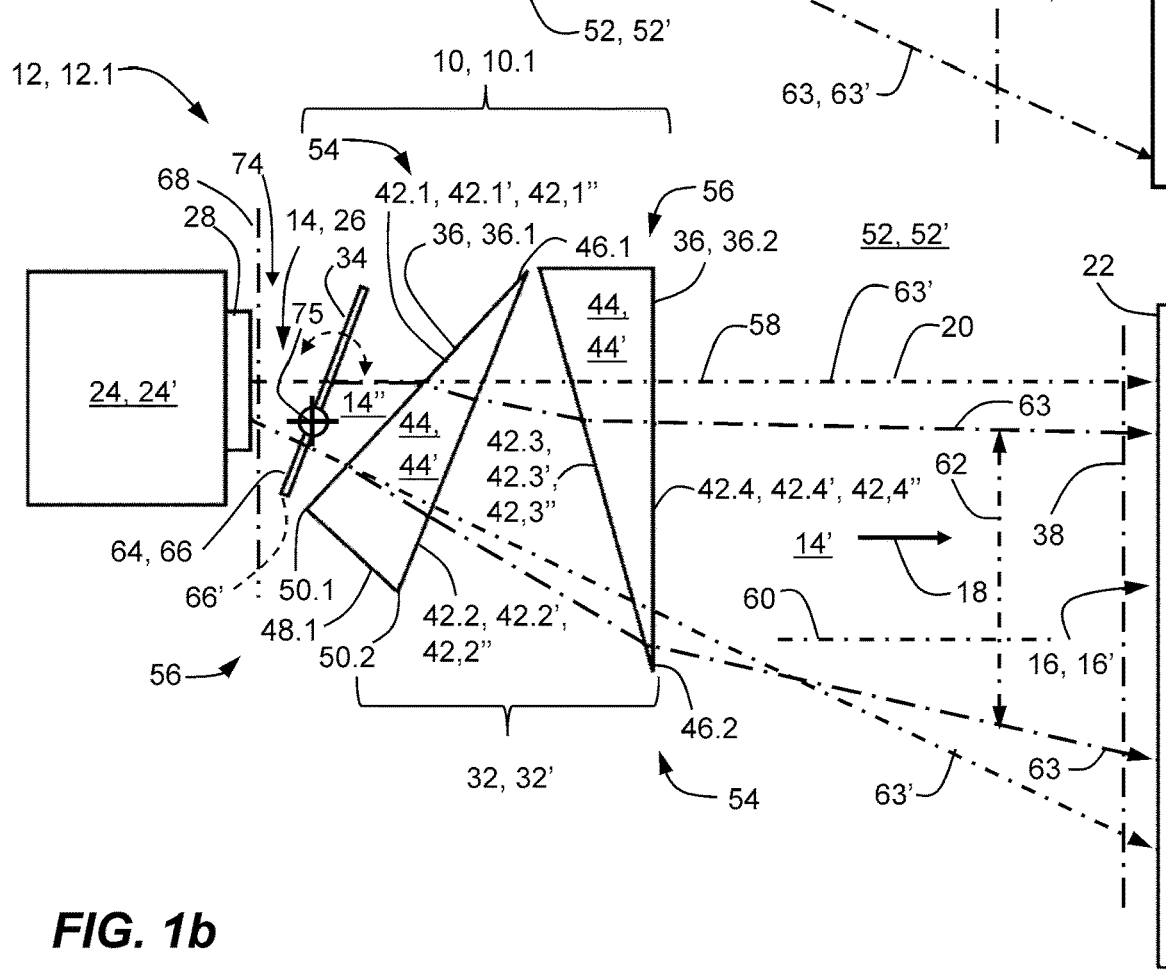
Figure 2A:
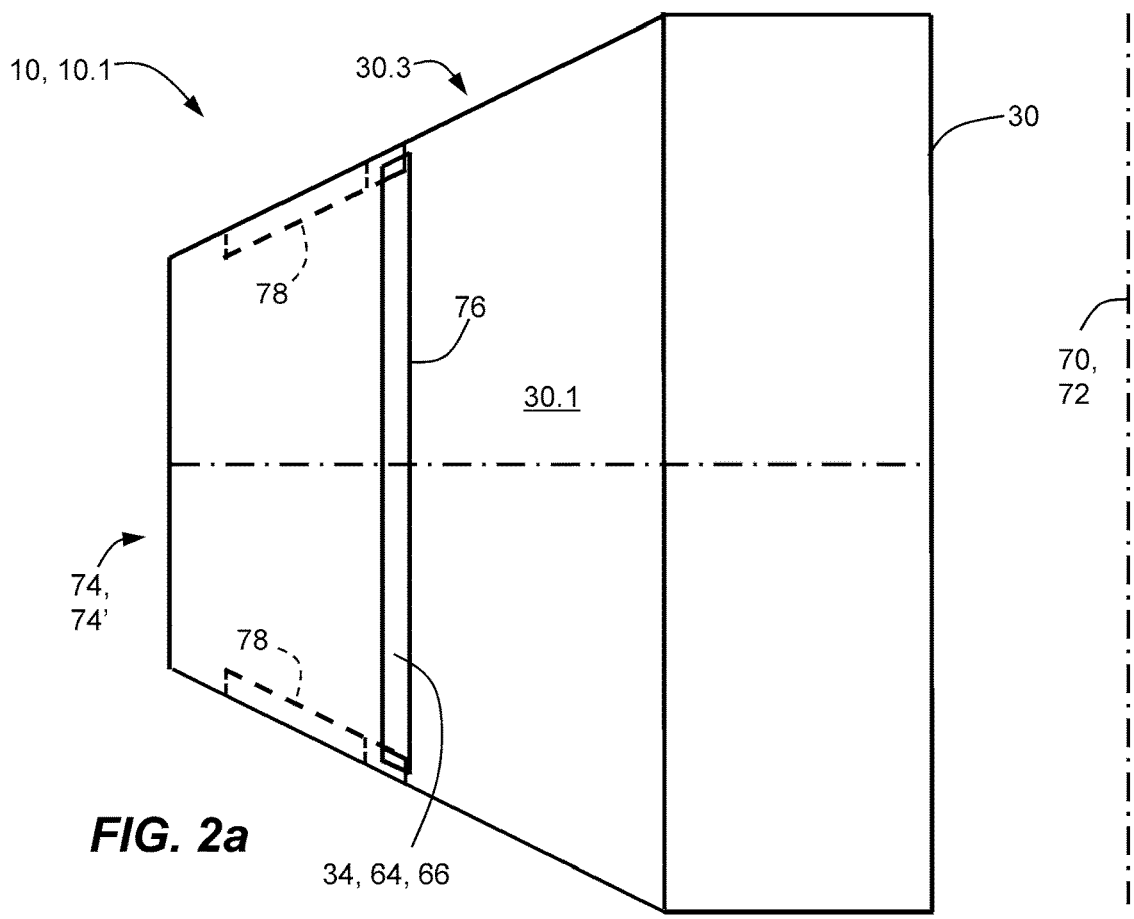
FIGS. 2a and 2b respectively illustrate top and side orthographic views of a physical embodiment of the first aspect of an anamorphic optical system illustrated in FIGS. 1a and 1b.
Figure 2B:
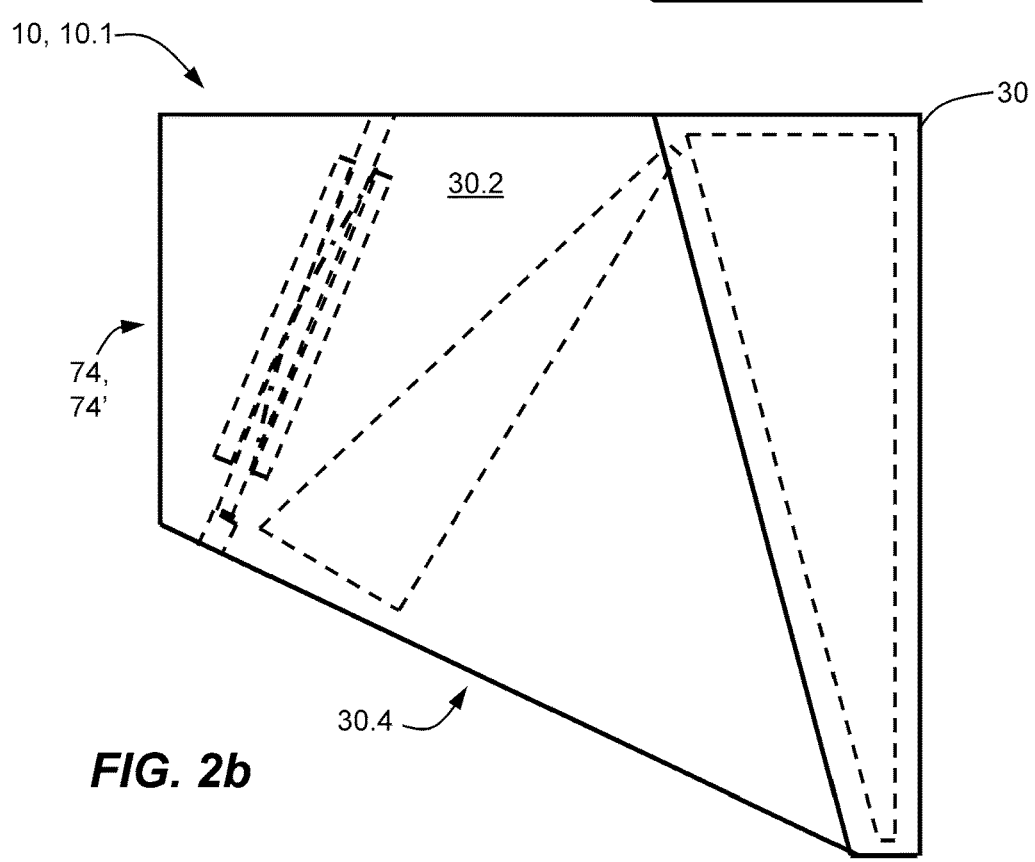

Referring to FIGS. 1a and 1b, an anamorphic optical system 10 is incorporated in an image projection system 12 so as to provide for anamorphically magnifying light 14 of an associated projected image 16 projected in a first direction 18 along an associated optic axis 20 onto a projection screen 22 by an associated image projector 24, for example, a video projector 24, 24'.

An anamorphic optical system 10 provides for different magnifications in different orthogonal directions normal to an optic axis 20. Anamorphic lenses have been most commonly used in the film industry to either compress a widefield image into a more square frame during filming or to decompress the developed film frame upon projection. More recently, anamorphic lenses have been used in the home theater industry to reformat the 16:9 or 17:9 aspect ratio of digital projectors into the more common 2.4:1 aspect ratio of the most popular movies. By using all the pixels of the 16:9 or 17:9 projector to show 2.4:1 content the image is both brighter and potentially of higher resolution than that provided by the conventional letter box format where pixels at the top and bottom of the image remain unused.

For example, in one embodiment, an electronic image projector 24, 24' generates and projects a plurality of modulated beams of light 26 through an associated projection lens 28, each beam of light 26 of a different primary color so as to provide for projecting a composite white-light projected image 16' on the projection screen 22. Alternatively, a film-based image projector 24 could be used to generate and project the light 14 of the projected image 16. Referring to FIGS. 2a through 5, in accordance with one set of embodiments, the anamorphic optical system 10 is incorporated in a housing 30 that, for example, may be attached either to the image projector 24, 24', or to the projection lens 28 thereof. Alternatively, the anamorphic optical system 10 could be either free-standing or incorporated in the image projector 24, 24' either ahead of or behind the projection lens 28.

The anamorphic optical system 10 comprises an anamorphic optical subsystem 32 in series with corrector optics 34. For example, an anamorphic optical subsystem 32 may comprise a prismatic anamorphic optical subsystem 32' comprising at least one optical prism 36. The anamorphic optical subsystem 32 is configured to provide magnification (i.e. anamorphic magnification) along an axis of anamorphic magnification 38, and no magnification in a direction that is orthogonal both to the axis of anamorphic magnification 38 and to the first direction 18. For example, in the embodiments illustrated in FIGS. 1a through 5, the axis of anamorphic magnification 38 is vertical and the level of magnification is less than unity so as to provide for relatively compressing the height of the resulting projected image 16 relative to that which would result without the anamorphic optical subsystem 32, so as to increase the aspect ratio of the image relative to that which would result without the anamorphic optical subsystem 32. As illustrated in FIGS. 1a and 1b, the size (i.e. transverse extent) of the projected image 16 as projected on the projection screen 22 is substantially larger than the size (i.e. transverse extent) of the projection lens 28. Accordingly, the projection lens 28 provides for expanding the overall size of the projected image 16 in cooperation with the anamorphic optical subsystem 32 that provides for modifying the aspect ratio thereof relative to that which would result without the anamorphic optical subsystem 32.

For example, prismatic anamorphic optical subsystems 32' are described in Modern Optical Engineering: The Design of Optical Systems, Third Edition by Warren J. Smith, McGraw-Hill, 2000 on pages 287-291, which is incorporated herein by reference. Generally, depending upon the shape of an optical prism 36, and the orientation thereof relative to the associated optic axis 20 along which light 14 is incident thereupon, the optical prism 36 can either expand or compress the size of a beam or projected image 16 associated with the incident light 14 along the axis of anamorphic magnification 38. Whereas a single optical prism 36 provides for both anamorphic magnification and redirection of the beam or projected image 16 associated with the incident light 14, a pair of optical prisms 36, 36.1, 36.2 in complementary orientation can provide for anamorphic magnification without redirecting the beam or projected image 16 associated with the incident light 14.

More particularly, the pair of optical prisms 36, 36.1, 36.2 comprises first 36.1 and second 36.2 optical prisms. The first optical prism 36, 36.1 comprises first 42.1 and second 42.2 optical surfaces with at least one optical medium 44 therebetween, wherein a first plane 42.1' underlying the first optical surface 42.1 intersects with a second plane 42.2' underlying the second optical surface 42.2 at a first apex 46.1. The first optical prism 36, 36.1 further comprises a first base boundary 48.1, wherein the first optical surface 42.1 comprises a first edge 50.1 that is distal to the first apex 46.1, and the second optical surface 42.2 comprises a second edge 50.2 that is distal to the first apex 46.1, with the first base boundary 48.1 extending between the first edge 50.1 and the second edge 50.2.

Similarly, the second optical prism 36, 36.2 comprises third 42.3 and fourth 42.4 optical surfaces with at least one optical medium 44 therebetween, wherein a third plane 42.3' underlying the third optical surface 42.3 intersects with a fourth plane 42.4' underlying the fourth optical surface 42.4 at a second apex 46.2. The second optical prism 36, 36.2 further comprises a second base boundary 48.2, wherein the third optical surface 42.3 comprises a third edge 50.3 that is distal to the second apex 46.2, and the fourth optical surface 42.4 comprises a fourth edge 50.4 that is distal to the second apex 46.2, with the second base boundary 48.2 extending between the third edge 50.3 and the fourth edge 50.4.

For example, in one set of embodiments, and in the embodiments illustrated in FIGS. 1*a* through 5, the first 42.1, second 42.2, third 42.3 and fourth 42.4 optical surfaces are respectively first 42.1", second 42.2", third 42.3" and fourth 42.4" planar optical surfaces, and the associated first 42.1', second 42.2', third 42.3' and fourth 42.4' planes and the first 46.1 and second 46.2 apexes are each substantially perpendicular to a common reference plane 52, for example, as illustrated in FIGS. 1*a*, 1*b*, 6*a* and 6*b*, a vertical plane 52' that is parallel to the optic axis 20.

The pair of optical prisms 36, 36.1, 36.2 are adapted to provide for anamorphic magnification by their arrangement in a complementary relationship, so that the first apex 46.1 is aligned with the second base boundary 48.2 relative to the optic axis 20, and the first base boundary 48.1 is aligned with the second apex 46.2 relative to the optic axis 20. Accordingly, the optic axis 20 of the anamorphic optical system 10 extends across and through the first 36.1 and second 36.2 optical prisms and the associated optical surfaces 42.1, 42.2, 42.3, 42.4 thereof, between the first 46.1 and second 46.2 apexes of the first 36.1 and second 36.2 optical prisms that are in complementary relationship with one another so that a relatively thinner portion 54 of the first optical prism 36, 36.1 and a relatively thicker portion 56 of the second optical prism 36, 36.2 are both on one side of the optic axis 20 along the axis of anamorphic magnification 38 of the anamorphic optical system 10, and a relatively thicker portion 56 of the of the first optical prism 36, 36.1 and a relatively thinner portion 54 of the second optical prism 36, 36.2 are on a diametrically opposed side of the optic axis 20 along the associated axis of anamorphic magnification 38. Accordingly, the complementary arrangement of the first 36.1 and second 36.2 optical prisms provides for anamorphic magnification by the anamorphic optical subsystem 32 without substantially redirecting the associated optic axis 20, so as to provide for using the anamorphic optical system 10 in an existing image projection system 12 without requiring substantial realignment thereof.

Referring to FIG. 1*b*, in accordance with a first aspect of an image projection system 12, 12.1 incorporating a first aspect of an associated anamorphic optical system 10, 10.1, the vertical center 58 of the image projector 24, 24' is positioned above the vertical center 60 of the projection screen 22, wherein a relatively downward projection of the projected image 16 from the image projector 24, 24' is provided for by a vertical-image-shifting capability of the associated projection lens 28 that provides for vertically shifting the associated optic axis that, in turn, provides for vertically shifting the associated projected image 16, in cooperation with the relatively thinner portion 54 of the first optical prism 36, 36.1 and the relatively thicker portion 56 of the second optical prism 36, 36.2 each being located above the relatively thicker portion 56 of the of the first optical prism 36, 36.1 and the relatively thinner portion 54 of the second optical prism 36, 36.2, respectively.

Alternatively, referring to FIG. 6*b*, in accordance with a second aspect of an image projection system 12, 12.2 incorporating a second aspect of an associated anamorphic optical system 10, 10.2, the vertical center 58 of the image projector 24, 24' is positioned below the vertical center 60 of the projection screen 22, wherein a relatively upward projection of the projected image 16 from the image projector 24, 24' is provided for by a vertical-image-shifting capability of the associated projection lens 28 that provides for vertically shifting the associated optic axis that, in turn, provides for vertically shifting the associated projected image 16, in cooperation with the relatively thinner portion 54 of the first optical prism 36, 36.1 and the relatively thicker portion 56 of the second optical prism 36, 36.2 each being located below the relatively thicker portion 56 of the of the first optical prism 36, 36.1 and the relatively thinner portion 54 of the second optical prism 36, 36.2, respectively.

Anamorphic optical systems are known to operate with least aberration in an afocal arrangement, wherein the light 14 propagating therethrough is collimated. For example, collimation optics may be used before and/or after the anamorphic optical system 10 so as to provide for this condition. This collimation condition is approximated in some applications such as home theater environments in which the projected image 16 is substantially distant from the projection lens 28 and the aperture of the projection lens 28 is very small relative to this distance. However, even slight deviations from ideal collimation can create astigmatic focus aberrations in the projected image 16 for an anamorphic optical system that does not otherwise provide for compensation thereof.

Accordingly, FIGS. 1*a* 1*b*, 6*a* and 6*b* illustrate conditions for which—as a result of magnification by the projection lens 28—the transverse extent 62 of the light 14 projected by the image projector 24, 24' expands with distance from the image projector 24, 24' as the light 14 is projected through the anamorphic optical system 10, the latter of which is located at a substantial distance from the projection screen 22. Referring to FIGS. 1*a* and 6*a*, the horizontal expansion of the projected image 16 is responsive to the associated projection lens 28, independent of the presence of the associated anamorphic optical system 10, as indicated by an associated image boundaries 63, 63' of the projected image 16, respectively with, and hypothetically without, the presence of the anamorphic optical system 10. Referring to FIGS. 1*b* and 6*b*, the nominal vertical expansion of the projected image 16 is responsive to the associated projection lens 28, as indicated by the resulting associated image boundary 63' of a hypothetical image generated without the presence of the anamorphic optical system 10, and the anamorphic optical system 10 acts to then vertically compress the projected image 16, as indicated by the associated image boundary 63. A prismatic anamorphic optical subsystem 32' naturally produces the optical aberration of astigmatism in projection applications, particularly if the associated light 14 is not collimated. Accordingly, the first 36.1 and second 36.2 optical prisms in combination generate at least one first aberration in the light 14 of the projected image 16. In addition to astigmatism, other examples of possible first aberrations include residual aberrations such as focus and/or chromatic aberrations.

In accordance with the teachings of U.S. Pat. No. 6,678,095, which is incorporated herein by reference, the corrector optics 34 of the anamorphic optical system 10 comprises at least one refractive or diffractive element 64—operatively associated with the first 36.1 and second 36.2 optical prisms—that generates at least one second aberration in the light 14 incident thereupon from the projected image 16, wherein the at least one second aberration provides for at least partially compensating for the at least one first aberration, so as to reduce the net amount of aberration in the light 14' exiting the anamorphic optical system 10.

Accordingly, the corrector optics 34 acts to pre-aberrate the light 14" entering the anamorphic optical subsystem 32 so as to reduce the resulting net aberrations in the light 14' exiting the anamorphic optical system 10. Generally, the corrector optics 34 may be placed anywhere in the optical path, either ahead of or after the anamorphic optical subsystem 32. However, if the incident light 14 exhibits angular field properties rather than being unidirectional, corrector optics 34 located ahead of the anamorphic optical subsystem 32 can be smaller than if located behind the anamorphic optical subsystem 32 where the light 14' exiting therefrom could be significantly diverged.

The corrector optics 34 may be constructed in accordance with any of a variety of different embodiments, the selection of which is dependent upon the desired characteristics of the anamorphic optical system 10. For example, referring to FIGS. 2b, 3b and 4b, in one set of embodiments, the corrector optics 34 incorporates a cylindrical corrector 66, the curvature of which is exaggerated in FIGS. 2b, 3b and 4b for purposes of illustration. In accordance with one set of embodiments, the cylindrical corrector 66 incorporates positive, i.e. convex, curvature, and is oriented so that at least a component of the associated axis of effective cylindrical curvature 70 is parallel to both the first 46.1 and second 46.2 apexes of the associated first 36.1 and second 36.2 optical prisms, and so that at least a component of the associated axis of effective cylindrical curvature 70 is perpendicular to the associated axis of anamorphic magnification 38. For example, for an anamorphic compression of 25 percent of a projected image 16 at a distance of ten meters from a projection lens 28, an associated plano-convex cylindrical corrector 66' having a twelve meter radius provides for bringing the projected image 16 into focus. A cylindrical corrector lens 66 having a net concave cylindrical curvature would be oriented in a relatively orthogonal direction relative to a cylindrical corrector lens 66 having a net convex cylindrical curvature. The anamorphic optical system 10 with a cylindrical corrector 66—and also generally for other corrector optics 34 arrangements—benefits from cooperation with a specific focal length of the incident light 14 from the projection lens 28 to provide a given focal length of the light 14' exiting the anamorphic optical system 10 with best focus. Such parameters may be readily generated through the use of conventional optical design algorithms known to those of ordinary skill in the art. The curvature of the cylindrical corrector 66 depends upon the nature of the associated at least one first aberration and the distance from the image projector 24, 24' to the projection screen 22, and the associated radius of curvature need not necessarily be constant, which is generally true herein when any reference is made herein to cylindrical curvature, or to a cylindrical lens.

In its simplest form, the corrector optics 34 incorporates a cylindrical surface, but with a barely perceptible curvature. For example, in one set of embodiments, the corrector optics 34 with a net cylindrical curvature has a cylindrical convex curvature, for example, plano-cylindrical-convex, cylindrical-convex-plano, or cylindrical-convex-cylindrical-convex, with associated axes of convex cylindrical curvature—i.e. each axis being a linear focus of all radii of that curvature—substantially parallel to the first 46.1 and second 46.2 apexes of the first 36.1 and second 36.2 optical prisms. In general, there may be more than one section of a curve, each section representing a different cylindrical radius forming a linear optical axis for such a section, and therefore in such a case there may be more than one optical axis, but with all such axes mutually parallel. For example, in one set of embodiments, the corrector optics 34 could incorporate an "S"-shaped composite cylindrical surface, with the upper and lower halves thereof each having a unique optical axis, but with both associated axes of curvature parallel to one another and to the first 46.1 and second 46.2 apexes. Generally, in accordance with one set of embodiments, the corrector optics 34 both provides an aberration to cancel the aberration of the pair of optical prisms 36, 36.1, 36.2 AND is at least one of a) angled at least ten degrees off normal to the optic axis 20 or b) of a positive curvature with an associated axis of effective cylindrical curvature 70 that is substantially parallel to both the first 46.1 and second 46.2 apexes of the associated first 36.1 and second 36.2 optical prisms. Furthermore, alternatively, the corrector optics 34 may incorporate non-cylindrical curvatures such as other conic sections—for example, with non-constant radii—and even more complex curvatures possibly without a single optical axis, but with associated plural optic axes parallel to one another.

For example, cylindrical lenses are common in the industry and can be made in a number of ways. Typically, and in one way, the cylindrical surface is generated and polished using CNC equipment. As the element gets to be thinner then another way is to vacuum mount (i.e. force) a thin flat substrate to a preformed curve, then polish a flat face on the other side, and then release the substrate so there is a net cylindrical curve.

Figure 3A:
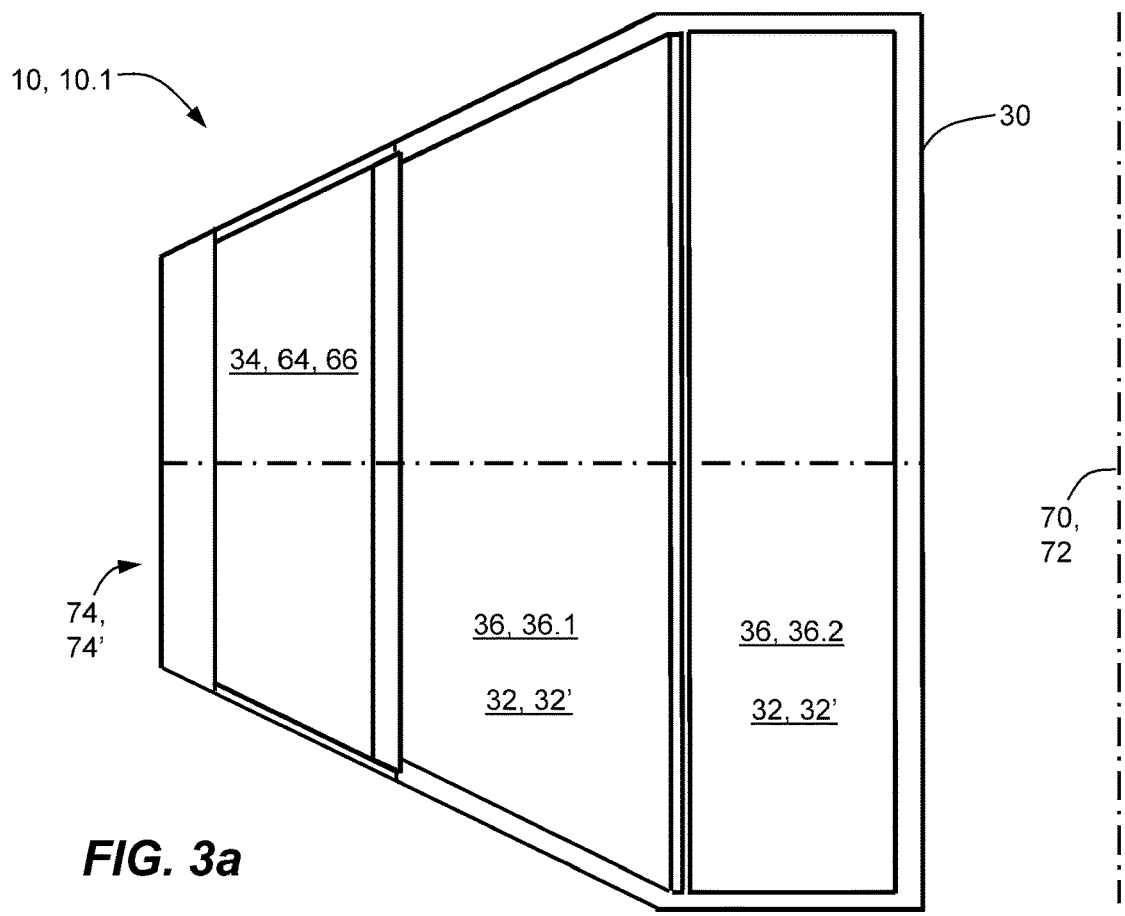
FIGS. 3a and 3b respectively illustrate top and side orthographic fragmentary views of the physical embodiment of the first aspect of the anamorphic optical system illustrated in FIGS. 2a and 2b, with the respective corresponding top and side surfaces of an associated housing removed.
Figure 3B:
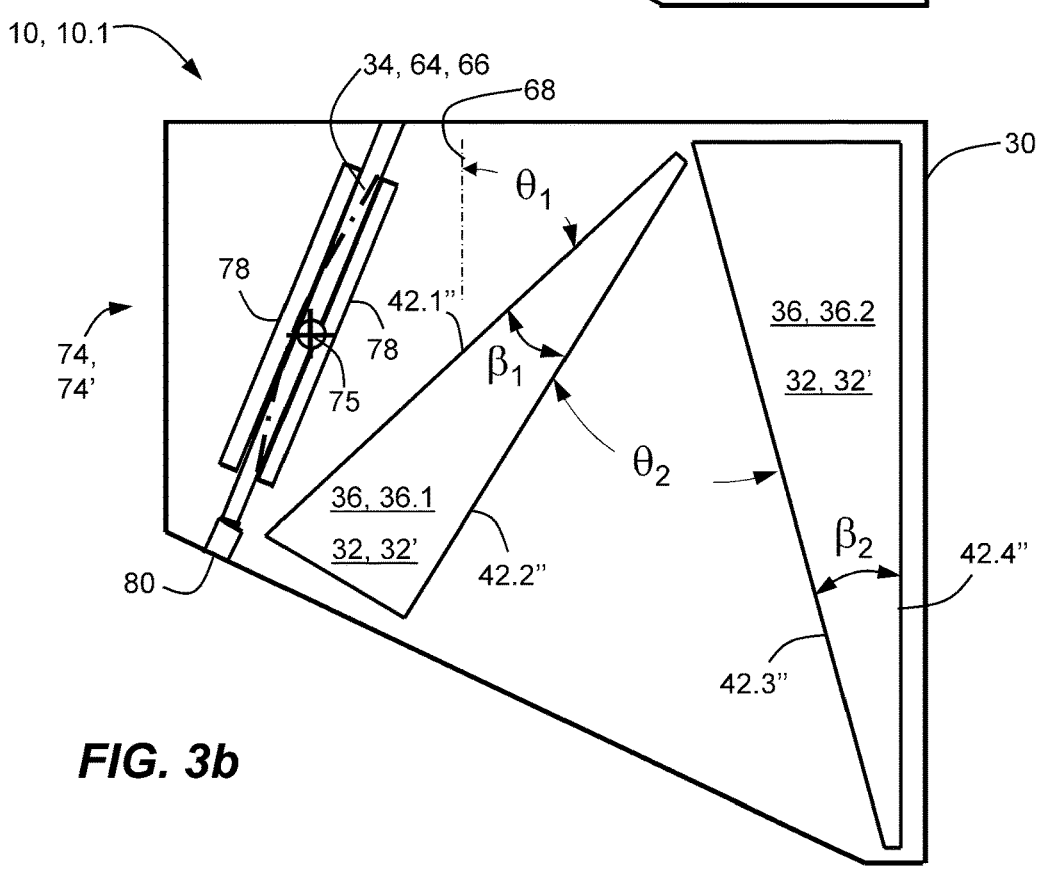
Figure 4A:
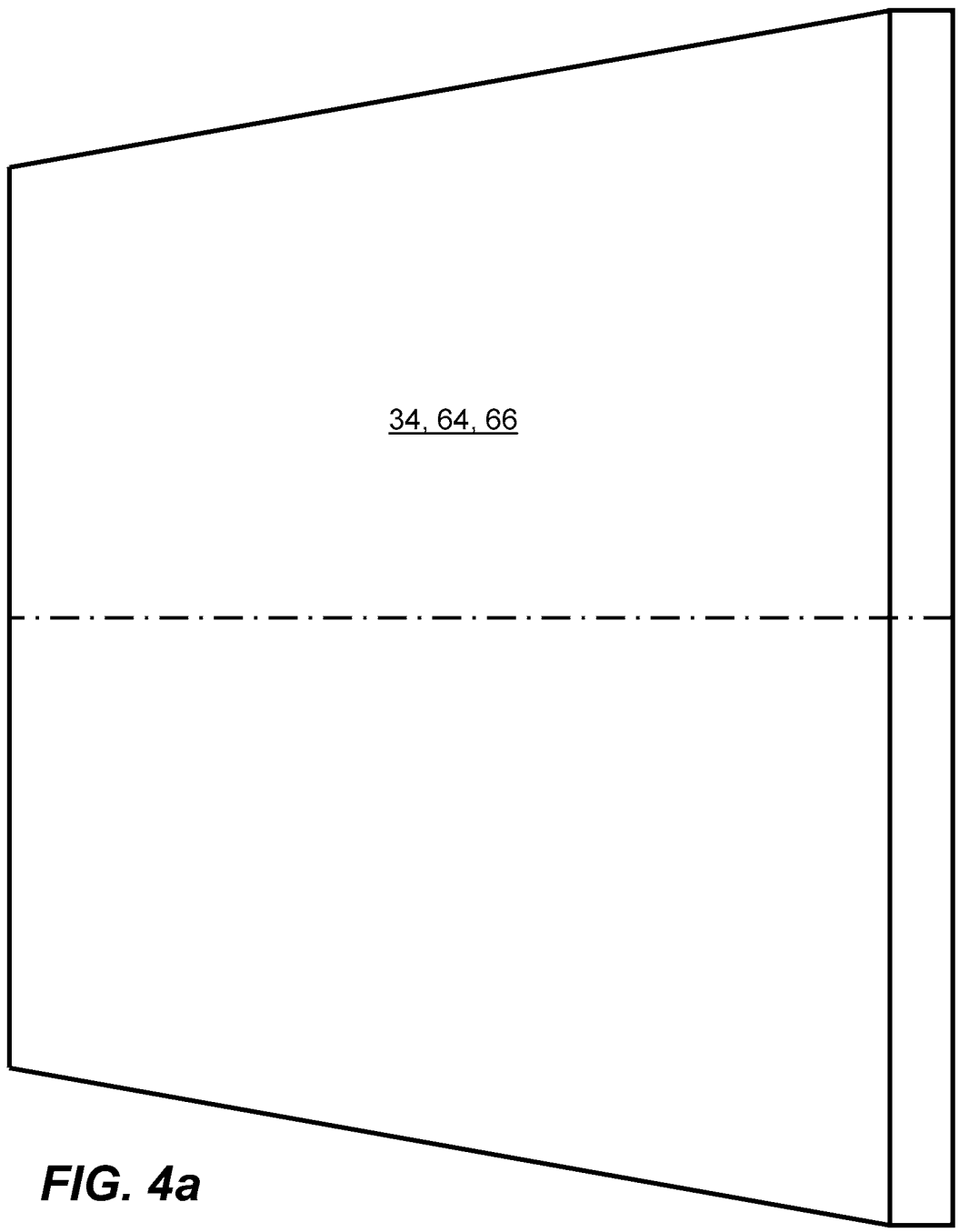
FIGS. 4a and 4b respectively illustrate top and edge views of a corrector element incorporated in the anamorphic optical system illustrated in FIGS. 2a through 3b.
Figure 4B:
Figure 5:
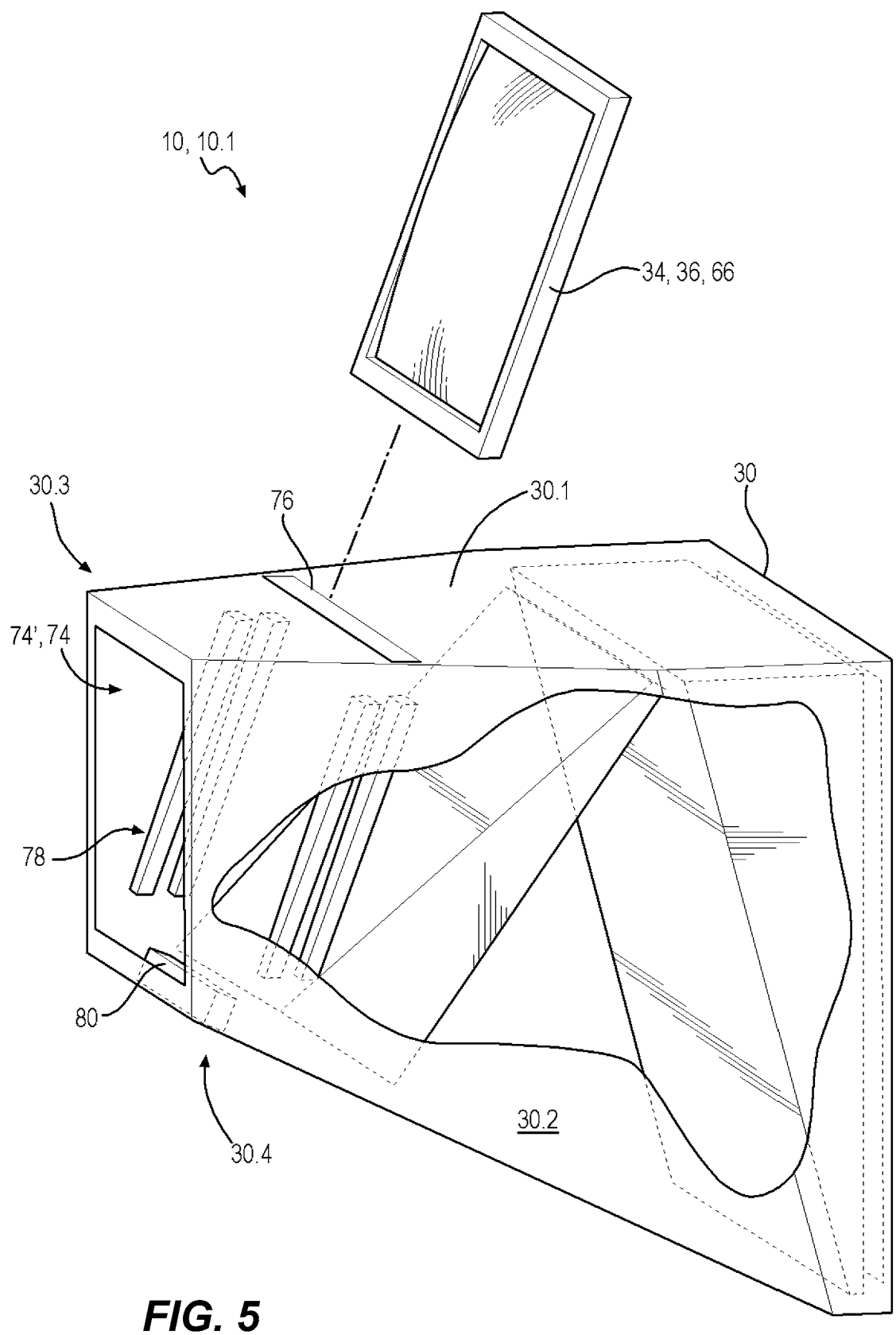
FIG. 5 illustrates an isometric view of a physical embodiment of the first aspect of the anamorphic optical system illustrated in FIGS. 2a through 4b.

Referring to FIG. 3b, in accordance with one set of embodiments, the first optical prism 36, 36.1 has a pair of first 42.1" and second 42.2" planar optical surfaces forming an associated first vertex angle $\beta_1$ therebetween, the second optical prism 36, 36.2 has a pair of third 42.3" and fourth 42.4" planar optical surfaces forming an associated second vertex angle $\beta_2$ therebetween, and the first 36.1 and second 36.2 optical prisms are arranged to form: a) a first angle $\theta_1$ between a front plane 68 of (or parallel to that of) the image projector 24, 24' and the first planar optical surface 42.1" of the first optical prism 36, 36.1, and b) a second angle $\theta_2$ between the second planar optical surface 42.2" of the first optical prism 36, 36.1 and the third planar optical surface 42.3" of the second optical prism 36, 36.2, wherein the angle between the fourth planar optical surface 42.4" of the second optical prism 36, 36.2 and the projection screen 22 is dependent upon angles $\beta_1$, $\beta_2$, $\theta_1$, $\theta_2$ and the angle between the projection screen 22 and the front plane 68 of the image projector 24, 24'. The associated angles $\beta_1$, $\beta_2$, $\theta_1$, $\theta_2$ are about a transverse axis 72 of the anamorphic optical system 10 and are configured to produce a particular less-than-unity magnification in the vertical dimension of the projected image 16, which—absent correction by the corrector optics 34,—would cause an astigmatic distortion of the projected image 16. Each of the angles $\beta_1$, $\beta_2$, $\theta_1$, $\theta_2$ of the first 36.1 and second 36.2 optical prisms, and each of their respective positions, are, in one set of embodiments, determined by the desired anamorphic magnification in the vertical dimension of the image while generally minimizing the angular deviation of the projection beam 26—i.e. the change in direction of the projection beam 26 relative to that without the presence of the first 36.1 and second 36.2 optical prisms— and minimizing the lateral chromatic aberration at the center of the projected image 16.

Furthermore, the relative angle of the combination of the first 36.1 and second 36.2 optical prisms relative to the beam of light 14 can be used to control the angular deviation in cooperation with a shifting capability of the projection lens 28 so as to provide for fine tuning the imaging geometry. For example, a downward tilt of the entire vertical-compression anamorphic optical system 10, without any change in the second angle $\theta_2$ between the first 36.1 and second 36.2 optical prisms will shift the projected image 16 downward, and thereby deviate the light 14' exiting the anamorphic optical system 10 downward, which also very slightly changes the associated anamorphic magnification, wherein for the first-aspect anamorphic optical system 10, 10.1 projecting downwards, the vertical anamorphic compression decreases slightly as the projected image 16 is shifted downward. The vertical-shifting capability of the projection lens 28 can then be used to adjust the vertical position of the projected image 16 back onto the projection screen 22. Accordingly, this process of adjusting the angular deviation of the anamorphic optical system 10 in combination with vertical shifting by adjustment of the projection lens 28 provides for a fine adjustment of the height of the projected image 16 so as to provide for fitting the projected image 16 within the projection screen 22. In one set of embodiments, the anamorphic optical system 10 is configured to provide for relatively minimal lateral chromatic aberration in the center of the projected image 16 but with increasing lateral chromatic aberration away from this center in the vertical dimension. For example, in one set of embodiments, the relative angles of the anamorphic optical system 10 are configured in combination with the refractive properties of the prisms to provide for relatively minimal lateral chromatic aberration in the center of the projected image 16, while naturally allowing increasing residual lateral chromatic aberration away from this center in the vertical dimension. More particularly, there is a unique nominal ray path for the pair of optical prisms 36, 36.1, 36.2 where the chromatic separation created by the first optical prism 36, 36.1 can be substantially reversed by the chromatic recombination of the second optical prism 36, 36.2. The more angular deviation from this unique path, the less the chromatic separation can be reversed, resulting in increased chromatic separation away from the image location corresponding to the direction of the nominal ray path. The separation distance between the first 36.1 and second 36.2 optical prisms has a negligible impact of the performance of the anamorphic optical system 10, although the lateral extent of the second optical prism 36, 36.2 would generally increase with separation distance in order to provide for intercepting the associated expanding beam of light 14, 14', 14".

The first angle $\theta_1$ between the front plane 68 of the image projector 24, 24' and the first planar optical surface 42.1" of the first optical prism 36, 36.1 is a natural consequence of implementing and optimizing a pair of optical prisms 36, 36.1, 36.2 of a vertical-compression anamorphic optical subsystem 32 in an image projection system 12, for which the projected image 16 is vertically offset from the location of the image projection system 12.

The magnitude of the first angle $\theta_1$ between the front plane 68 of the image projector 24, 24' and the first planar optical surface 42.1" of the first optical prism 36, 36.1 depends both upon the vertical offset of the projected image 16 relative to that of the image projector 24, 24' and upon the desired level of vertical magnification. For example, if there were no vertical offset and zero vertical magnification then the first 36.1 and second 36.2 optical prisms would be nested and act as a block of glass with parallel faces directly in front of the image projector 24, 24', in which case the first angle $\theta_1$ between the front plane 68 of the image projector 24, 24' and the first planar optical surface 42.1" of the first optical prism 36, 36.1 would be zero, but then there would also be no resulting astigmatism—because of no anamorphic magnification—so correction for that would not be necessary. The magnitude of the first angle $\theta_1$ increases in relation to the magnitude of the vertical offset as a result of the nested block rotating so as to maintain the first planar optical surface 42.1" relatively normal to the downwardly-projected or upwardly-projected beams of light 26 for optimization of the projected image 16. The magnitude of the first angle $\theta_1$ also increases in relation to the amount of anamorphic compression (i.e. reduction from unity of the anamorphic magnification) as a result of the first apex 46.1 of the first optical prism 36, 36.1 being rotated away from the front plane 68 of the image projector 24, 24' to create that magnification in cooperation with the second optical prism 36, 36.2 as a result of a rotation of the first optical prism 36, 36.1 about the transverse axis 72 of the anamorphic optical system 10, wherein the anamorphic magnification increases with increasing magnitude of the first angle $\theta_1$. Accordingly, in some embodiments, the overall angle of the anamorphic optical system 10 relative to the image projector 24, 24' can be adjusted to accommodate variations in the offset of the image projector 24, 24' relative to the projection screen 22.

In practice, generally a limited number, or range, of anamorphic magnifications are sufficient for use in most image projection systems 12, a range that is limited by uncorrected chromatic aberration or geometric distortion. Accordingly, given that the magnitude anamorphic magnification is determined by the configuration of the pair of optical prisms 36, 36.1, 36.2, a single, common level of anamorphic magnification is typically suitable for substantial number of installations, leaving the distance from the image projector 24, 24' to the projection screen 22 as the principal parameter that might be vary from one installation to another, which is accommodated by the configuration of the corresponding corrector optics 34 for that installation.

Referring to FIGS. 1a, 1b, 2a and 3a, generally, the corrector optics 34 incorporate at least one axis of effective cylindrical curvature 70, either of an associated physical surface, or that of an equivalent physical element, for example, equivalent in effect to corrector optics 34 comprising a diffractive optical element. It has been discovered that the level of astigmatism in the light 14' exiting the anamorphic optical system 10 is responsive to a rotation of the corrector optics 34 about the transverse axis 72 of the anamorphic optical system 10 at an angle that is greater than 10 degrees and less than the first angle $\theta_1$, so as to provide for nesting the corrector optics 34 within the space between the first optical prism 36, 36.1 and an entrance 74 of the anamorphic optical system 10, wherein the transverse axis 72 is normal to the optic axis 20 of the anamorphic optical system 10, normal to the axis of anamorphic magnification 38, parallel to both the first 46.1 and second 46.2 apexes, and parallel to the at least one axis of effective cylindrical curvature 70. The provision for anamorphic vertical compression (i.e. less than unity anamorphic magnification) in cooperation with the general downward projection of the light from projector to screen, results in an associated sufficiently large magnitude of the first angle $\theta_1$ to provide space for rotation of the corrector optics 34 within the space between the entrance 74 of the anamorphic optical system 10 and the first optical prism 36, 36.1. In one set of embodiments of the anamorphic optical system 10, the corrector optics 34 are rotated about an associated axis of rotation 75 at a fixed angle, with the installation-dependent corrector optics 34 being configured for the particular distance from the image projector 24, 24' to the projection screen 22 for the particular installation of the image projection system 12.

For example, in accordance with one approach to designing the corrector optics 34, using optical-design software, the anamorphic optical subsystem 32 of the image projection system 12 could first be modeled as two windows of glass with a pair of parallel flat surfaces, —which produce no anamorphic magnification, —with the angles $\beta_1$, $\beta_2$, $\theta_1$, $\theta_2$, between the various surfaces defined as variables in pursuit of the desired anamorphic magnification with minimal lateral chromatic aberration, minimal overall beam deviation, and perhaps some other desirable conditions that collectively form an associated first merit function, i.e. beginning with $\beta_1$ and $\beta_2$, both equal to zero. If such a block of glass were put into a beam of light 26 projecting generally downward, then the best orientation of that block that provides for minimizing both deviation—i.e. the change in path as a result of the presence of the block of glass—of the beam of light 26 and lateral chromatic aberration in the center of an associated projected image 16 would be with the parallel surfaces normal to the beam of light 26. Accordingly, the block would be rotated away from the front plane 68 of the image projector 24, 24' by the first angle $\theta_1$ about the transverse axis 72 of the anamorphic optical system 10. When different from zero, the second angle $\theta_2$ between the first 36.1 and second 36.2 optical prisms provides for creating anamorphic magnification, wherein the associated magnification is either above or below unity depending on the locations of the respective base boundaries 48.1, 48.2 and apexes 46.1, 46.2, and depending on the second angle $\theta_2$. For example, for the first 36.1 and second 36.2 optical prisms rotated as illustrated in FIG. 1b, with the apex 46.1 of the first optical prism 36, 36.1 proximate to the second base boundary 48.2 of the second optical prism 36, 36.2, i.e. pointing up, the resulting anamorphic magnification is less than unity. However, with the first 36.1 and second 36.2 optical prisms rotated relative to one another about the transverse axis 72 of the anamorphic optical system 10, the same as illustrated in FIG. 1b, but with each of the first 36.1 and second 36.2 optical prisms rotated 180 degrees relative the their orientation illustrated in FIG. 1b, thereby making the first base boundary 48.1 of the first optical prism 36, 36.1 proximate to the second apex 46.2 of the second optical prism 36, 36.2, i.e. with both pointing up, the resulting anamorphic magnification would be greater than unity.

The optical-design software searches the variable space of the model of the anamorphic optical system 10 to determine the best angles $\beta_1$, $\beta_2$, $\theta_1$, $\theta_2$ of all components that provide for minimizing the associated first merit function.

After determining the angles $\beta_1$, $\beta_2$, $\theta_1$, $\theta_2$, and respective positions of the first 36.1 and second 36.2 optical prisms, the angle and curvature of the corrector optics 34 relative to the fixed pair of optical prisms 36, 36.1, 36.2 is then determined, wherein, for example, the angle is measured about the transverse axis 72 of the anamorphic optical system 10 that is normal to both the optic axis 20 and to the axis of anamorphic magnification 38. Although the optimum angular orientation and the cylindrical curvature (or generally, astigmatism correction properties) of the corrector optics 34 can be experimentally determined, alternatively, conventional optical design software may be used to determine values of these parameters that provide for minimizing an associated second merit function, for example, a second merit function responsive to a combination of the size and shape of an optical impulse response—i.e. the size and shape of the projected image 16 of a spot, e.g. so that the minimization of the second merit function provides for the sharpest projected image 16—throughout the lateral extent of the projected image 16 for a particular wavelength, or set of wavelengths. Accordingly, the angular orientation of the corrector optics 34 is optimized along with the amount of astigmatism correction in order to minimize the second merit function that is responsive to the optical impulse response of the image projection system 12, wherein the angle of the corrector optics 34 would be constrained to be within following range of angles: a) greater than a minimum angle to the front plane 68 of the image projector 24, 24' that provides for minimizing the impact of stray light on the projected image 16, and b) less than a maximum angle given by either b.1) the first angle $\theta_1$ to the first optical surface 42.1 of the first optical prism 36, 36.1 or, alternatively, b.2) an angle that is sufficient to prevent the gravity-driven accumulation of contaminants on a surface of the corrector optics 34.

In accordance with one set of embodiments, the second merit function accounts for the symmetry of the optimal impulse response, i.e. a spot in the projected image 16 of an infinitesimal point of light of the object being imaged. For example, a measure of the size and symmetry of a spot, —e.g. ether peak-to-valley or RMS size in either or both primary image dimensions, e.g. horizontal and vertical, or principal orthogonal directions associated with a rotated projected image 16, —or an associated composite measure associated with a plurality of spots, is minimized so as to account for one or more locations throughout the possible lateral range of the projected image 16, wherein each infinitesimally small spot in the object being imaged would ideally result in a similarly infinitesimally small spot in the projected image 16, subject to diffraction limitations. In accordance with one set of embodiments, the optimization of the size and shape of the spot is done separately for each primary color, rather than of a multi-colored spot of all colors together. For example, in one set of embodiments, the overall optimization of the angle and curvature of the corrector optics 34 can be responsive to a composite second merit function that is a combination—for example, a linear combination—of the values of a plurality of individual second merit functions, the latter of which are each individually determined for a corresponding particular location of the spot in the projected image 16 for a particular primary color, for a plurality of particular locations and a plurality of primary colors.

Astigmatism resulting from an uncorrected anamorphic optical system 10 used in combination with an optimally focused image projection system 12 manifests as an elongation of associated image spots in a first dimension relative to a more focused dimension that is orthogonal to the first dimension. Accordingly, as an anamorphic optical system 10 is optimized by corrector optics 34 to neutralize astigmatism, such elongation ideally decreases to the extent that each spot representing a corresponding different field location in the image is not only minimized in size but also substantially symmetric in both dimensions for each particular primary color employed by the image projection system 12. It has been discovered that the magnitude of the angle of the corrector optics 34 that provides for diminishing astigmatism to the extent that provides for a visible improvement in the projected image 16 is greater than that which just provides for preventing light from the projector lens from being partially scattered or retroreflected back into the projector lens, for example, in accordance with U.S. Pat. No. 7,995,282, which is incorporated herein by reference. In accordance with one set of embodiments, the angle of the corrector optics 34 is determined to be that which either a) minimizes the associated second merit function within the range of 15 degrees from the front plane 68 of the image projector 24, 24' to 15 degrees from the first planar optical surface 42.1" of the first optical prism 36, 36.1, or b) for which the most elongated dimension of any image point spot is no more than three times the size of that same spot in any other dimension, or c) for which the maximum extent of the optical impulse response with the corrector optics 34 present is substantially reduced relative to the maximum extent of the optical impulse response without the corrector optics 34 present, wherein as used herein, a substantial reduction means at least a 50 percent reduction in the maximum lateral extent of a projected image 16 of an associated point-source object relative to that without the presence of the corrector optics 34 in the anamorphic optical system 10. In one set of embodiments, this optimization generally leads to an optimum angular orientation for which the corrector optics 34 forms an approximately equal angle between the front plane 68 of the image projector 24, 24' and the first planar optical surface 42.1" of the first optical prism 36, 36.1, and for which any deviation from the optimum angular orientation optimum arrangement, such as orienting the corrector more parallel with respect to the front plane 68 of the image projector 24, 24', or more parallel with respect to the first planar optical surface 42.1" of the first optical prism 36, 36.1, will produce increasingly deleterious results. However, within an angular range, for example 15 degrees from the front plane of the projector to 15 degrees from the first surface of the first optical prism 36, 36.1, the performance of the herein-described anamorphic optical system 10 has been found to be superior relative to that of the anamorphic optical system using corrector optics 34 in accordance with U.S. Pat. No. 7,995,282.

Accordingly, in one set of embodiments, the configuration of the anamorphic optical system 10 is determined using two consecutive optimizations, the first using the first merit function to determine the angles $\beta_1$, $\beta_2$, $\theta_1$, $\beta_2$, in cooperation with the relative location and orientation of the image projector 24, 24' and the projection screen 22, and the second using the second merit function to determine the angle and astigmatism correction of the corrector optics 34. Accordingly, for a fixed anamorphic magnification of the pair of optical prisms 36, 36.1, 36.2, the resulting optimum angle of the corrector optics 34 can be fixed, and therefore need not be adjustable, so that a different corrector optics 34 having a different astigmatism correction can be inserted at the same angle and still be perceptively optimum for different distances between the image projector 24, 24' and the projection screen 22—i.e. different throw distances, —with the only difference from one corrector optics 34 to another being the level of astigmatism correction based on throw distance of a specific installation. The first merit function generally pertains to angular magnification and possible minimization of chromatic aberration, with the corrector optics 34 actually having relatively little or no impact on these characteristics. Accordingly, the second merit function based on spot size and shape alone is used determine the astigmatism correction properties of the corrector optics 34. As an alternative to separate first and second merit functions, a combined merit function with all parameters could be used with a single optimization, with the relative weighting of desired outcomes programmed accordingly.

The above range of corrector angles associated with a range of improved astigmatism correction provides for flexibility in configuring a particular anamorphic optical system 10. For example, referring to FIGS. 1a-6b, the illustrated angle of the corrector optics 34, while optimized to minimize the astigmatism of the resulting image, additionally results in the corrector optics 34 being rotated relatively-more-horizontally than if the angle of the corrector optics 34 to the front plane 68 of the image projector 24, 24' were smaller. If no additional optical components are present between the corrector optics 34 and the projection lens 28, any open air gaps between the projection lens 28 and the anamorphic optical system 10 will subject a relatively-upper surface of the corrector optics 34 to contaminants such as dust, with increased gravitational accumulation thereupon due to the greater horizontal orientation and a greater horizontal component of surface area. Accordingly, in accordance with one set of embodiments, the particular angle of the corrector optics 34 may be different from that which provides for a fully optimized astigmatism correction, in exchange for some other design benefit. For example, the corrector optics 34 may be angled less than optimum for astigmatism correction—for example, so as to favor a relatively-more-vertical orientation, —so that the corrector optics 34 accumulates fewer contaminants over time, while providing for at least a sufficient minimum level of correction for astigmatism.

For example, in one set of embodiments, the resulting angle of the corrector optics 34 that provides for a sufficient reduction in astigmatism in the projected image 16 is at least 20 percent—and typically greater than that, —of the total angle between the front plane 68 of the image projector 24, 24' and the first planar optical surface 42.1" of the first optical prism 36, 36.1, below which limit the astigmatism correction of a single corrector optics 34 is less effective than the corresponding correction that would be provided for by sufficiently-curved cylindrical surfaces applied directly to the pair of optical prisms 36, 36.1, 36.2, for example, in accordance with U.S. Pat. No. 6,678,095.

The rotated corrector optics 34 in accordance with the herein-described anamorphic optical system 10 provides compensation for astigmatism comparable to curved surface prisms of U.S. Pat. No. 6,678,095 while also providing for reflecting stray light away from the projection lens 28 as provided for by U.S. Pat. No. 7,995,282, i.e. the latter of which provides for preventing light—from the projection lens 28—from otherwise being partially scattered or retroreflected back into the projection lens 28 and then, in turn, scatter or retroreflect back through the anamorphic optical system 10 and to the projection screen 22. However, for the anamorphic optical system of U.S. Pat. No. 7,995,282 utilizing flat-surfaced prisms—for which the associated corrector optics 34 is rotated only by an angle up to that which provides for minimizing stray light from reaching the projected image 16, —at least some of the associated image spots remain noticeably elongated regardless of the degree of astigmatism correction offered by any given cylindrical radius, or functionally equivalent property, as a result of an incomplete correction of astigmatism by the associated corrector optics 34.

It should be understood that the corrector optics 34 could alternatively be located between the first 36.1 and second 36.2 optical prisms, or after the second optical prism 36, 36.2, rather than between the first optical prism 36, 36.1 and the image projector 24, 24'. However, the lateral size of the corrector optics 34 will increase with distance from the image projector 24, 24' as a result of divergence of the beams of light 26 from the projection lens 28 of the image projector 24, 24'.

Referring to FIGS. 2a through 5, in accordance with one set of embodiments, the anamorphic optical system 10 is incorporated within an associated housing 30 that provides for fixedly retaining the first 36.1 and second 36.2 optical prisms in relation to one another, and provides for positioning a removeable and replaceable corrector optics 34 at a relatively fixed angle relative to the first 36.1 and second 36.2 optical prisms, in a location between the entrance 74, 74' of the housing 30 and the first optical prism 36, 36.1, so as to provide for the above-described compensation of at least one aberration—for example, astigmatism—caused by the first 36.1 and second 36.2 optical prisms, and so as to provide for easily initially configuring, and then maintaining, the anamorphic optical system 10. More particularly, in one set of embodiments, the corrector optics 34 is inserted through a slot 76 in the top 30.1 of the housing 30, and then slid between a set of internal guides 78 depending internally from each of the sides 30.2, 30.3 of the housing 30, and is supported from either the bottom 30.4 of the housing 30, or from a stop 80 depending therefrom. The corrector optics 34 with appropriate cylindrical curvature for the particular image projection system 12 is inserted into the housing 30 to provide for operation of the image projection system 12 with aberration compensation. Generally, the removability of the corrector optics 34 provides for readily adapting the anamorphic optical system 10 to any particular configuration of the image projection system 12. During operation thereof, the upward-facing non-vertical surface of the corrector optics 34, if exposed to open air, can be prone to an accumulation of contaminants that will likely degrade the light throughput through the anamorphic optical system 10, and more significantly—especially for an image projection system 12, —can cause scattering of the associated beams of light 26 that can result in a significant reduction in image contrast. Accordingly, the corrector optics 34 may be readily removed from the housing 30 and cleaned to alleviate this problem if this should occur. The relatively-small size of the slot 76 through the top 30.1 of the housing 30, in cooperation with the blockage thereof by the corrector optics 34 following installation thereof in the housing 30, helps to mitigate against the incursion and accumulation of contaminants on the corrector optics 34. The slot 76 could be further sealed from contaminant intrusion by a separate cover. In one set of embodiments, the corrector optics 34 would be replaced only when not actually mounted to the image projector 24, 24', for example, by inserting a tool from the rear opening, making contact with the corrector—perhaps with a notch in the corrector frame, —and then pushing the corrector optics 34 out through the slot 76 in the housing 30 at least enough to then be pulled therethrough and therefrom.

Alternatively, —particularly for embodiments for which the corrector optics 34 are located either between the first 36.1 and second 36.2 optical prisms, or following the second optical prism 36, 36.2, —the housing 30 could be split into first and second mating sections that would be separated to provide for installing, removing or replacing the corrector optics 34, but which would otherwise provide for retaining the first 36.1 and second 36.2 optical prisms and the corrector optics 34 in correct angular and positional relationship after the first and second mating sections of the housing 30 are reassembled.

Accordingly, the rotated corrector optics 34 of the anamorphic optical system 10 provides for exemplary anamorphically-magnified image quality even when using a relatively-fixed arrangement of a pair of relatively lower cost flat-surfaced complementarily-positioned optical prisms 36, 36.1, 36.2, and provides for readily accommodating different projection distances by simply changing the associated corrector optics 34. In one set of embodiments, the pair of relatively lower cost flat-surfaced complementarily-positioned optical prisms 36, 36.1, 36.2 is fixedly positioned within a housing 30 that includes a rear, projector-facing, easily accessible means for retaining the corrector optics 34 at a fixed angle relative to the fixedly-mounted pair of optical prisms 36, 36.1, 36.2, wherein the different corrector optics 34 may be used to accommodate different projection distances.

In accordance with a method of anamorphically magnifying an image 16, light 14, 14' of an image 16 is projected along a first axis 20 through an anamorphic optical system 10, 10.1, 10.2 incorporating at least one first optical prism 36, 36.1, at least one second optical prism 36, 36.2 and an optical corrector 34, and an anamorphically magnified image 16 is formed from the light 14, 14' of the image 16 after the operation of projecting the light through the anamorphic optical system 10, 10.1, 10.2. The at least one first optical prism 36, 36.1 incorporates a) a first surface 42.1; b) a second surface 42.2, wherein a first plane 42.1' underlying the first surface 42.1 intersects with a second plane 42.2' underlying the second surface 42.2, and the first 42.1' and second 42.2' planes intersect at a first apex 46.1; c) a first base boundary 48.1, wherein the first surface 42.1 comprises a first edge 50.1 that is distal to the first apex 46.1, the second surface 42.2 comprises a second edge 50.2 that is distal to the first apex 46.1, and the first base boundary 48.1 extends between the first edge 50.1 and the second edge 50.2; and d) at least one optical medium 44 between the first surface 42.1 and the second surface 42.2. The at least one second optical prism 36, 36.2 incorporates a) a third surface 42.3; b) a fourth surface 42.4, wherein a third plane 42.3' underlying the third surface 42.3 intersects with a fourth plane 42.4' underlying the fourth surface 42.4, and the third 42.3' and fourth 42.4' planes intersect at a second apex 46.2; c) a second base boundary 48.2, wherein the third surface 42.3 comprises a third edge 50.3 that is distal to the second apex 46.2, the fourth surface 42.4 comprises a fourth edge 50.4 that is distal to the second apex 46.2, and the second base boundary 48.2 extends between the third edge 50.3 and the fourth edge 50.4; and d) at least one optical medium 44 between the third surface 42.3 and the fourth surface 42.4, wherein the first 46.1 and second 46.2 apexes are substantially parallel—i.e. within plus or minus 20 degrees of parallelism—with respect to one another, the first 46.1 and second 46.2 apexes are each substantially perpendicular—i.e. within plus or minus 20 degrees of perpendicularity—to the first axis 20, the first 36.1 and second 36.2 optical prisms are arranged in a complementary relationship, so that the first apex 46.1 and the second base boundary 48.2 are both offset in a first transverse direction relative to the first axis 20, the second apex 46.2 and the first base boundary 48.1 are both offset in a second transverse direction relative to the first axis 20, the first and second transverse directions are opposite relative to one another, the first 36.1 and second 36.2 optical prisms in combination provide for anamorphic magnification of the light 14, 14' of the image 16 when the light 14, 14' passes through the first 36.1 and second 36.2 optical prisms, a direction of the anamorphic magnification is substantially perpendicular—i.e. within plus or minus 20 degrees of perpendicularity—to the first 46.1 and second 46.2 apexes and to the first axis 20, and the first 36.1 and second 36.2 optical prisms in combination generate at least one first aberration in the light 14, 14' of the image 16. The optical corrector 34 incorporates at least one refractive or diffractive element, wherein the optical corrector 34 exhibits anamorphic optical power associated with at least one linear axis of cylindrical curvature 70, each at least one linear axis of cylindrical curvature 70 is substantially parallel—i.e. within plus or minus 20 degrees of parallelism—to each of the first 46.1 and second 46.2 apexes, the optical corrector 34 is rotated about an axis of rotation 75 parallel to the at least one linear axis of cylindrical curvature 70 relative to the first axis 20 by a corresponding rotation angle that provides for at least partially compensating for at least one first aberration responsive to the corresponding rotation angle, wherein, in accordance with one set of embodiments, the corresponding rotation angle is in excess of 10 degrees off normal to the optical corrector 34 relative to the first axis 20. The method may further comprise adjusting the rotation angle α of the optical corrector 34 so as to provide for focusing the anamorphically magnified image 16, 16'.

In accordance with yet another set of embodiments, a method of anamorphically magnifying an image may comprise a) projecting light 14, 14" of the image from an image projector 24 through an anamorphic optical system 10 generally along a first axis 20, wherein the anamorphic optical system 10 operates on the light 14, 14" to provide anamorphic magnification of the image 16, 16' along or in a direction of a magnification axis 38 of the image 16, 16', wherein the anamorphic optical system 10 produces at least one optical aberration in the image 16, 16'; and b) passing the light 14, 14" of the image through an optical corrector 34, wherein the optical corrector 34 incorporates at least one refractive or diffractive element, the optical corrector 34 exhibits anamorphic optical power so as to provide for at least partially compensating for at least one optical aberration; and the optical corrector 34 is rotated about an axis 75 that is substantially perpendicular to the magnification axis 38 by an angle that is off normal 130 relative to the first axis 20 and in excess of 10 degrees.

The at least one first aberration may comprise astigmatism. The optical corrector 34 may be rotated about the at least one linear axis of cylindrical curvature 70 relative to the first axis 20 by an angle that provides for a lateral extent in any one lateral direction of an associated optical impulse response that does not exceed more that 300 percent of a corresponding the lateral extent in any other lateral direction of the associated optical impulse response. In one set of embodiments, the at least one refractive or diffractive element incorporates a cylindrical lens 66. In one set of embodiments, the cylindrical lens 66 also incorporates either at least one convex optical surface or at least one planar optical surface. In one set of embodiments, the at least one refractive or diffractive element incorporates a curved substrate of optical material that is curved about the at least one linear axis of cylindrical curvature 70.

In accordance with one set of embodiments, the at least one first optical prism 36, 36.1 is located in front of the at least one second optical prism 36, 36.2 relative to a propagation of the light 14, 14' through the anamorphic optical system 10, 10.1, 10.2, and the corrector is located in front of the at least one first optical prism 36, 36.1 so as to initially receive the light of the image 16. In accordance with another set of embodiments, the optical corrector 34 is located between the at least one first optical prism 36, 36.1 and the at least one second optical prism 36, 36.2 so as to receive the light of the image 16 from the first optical prism 36, 36.1.

The at least one first optical prism 36, 36.1 may incorporate a plurality of first optical prisms 36, 36.1 abutting one another and constructed of at least two different optical materials, wherein the plurality of first optical prisms 36, 36.1 abutting one another and constructed of the at least two different optical materials provide for at least partially compensating for chromatic aberration in the image 16. Furthermore, the at least one second optical prism 36, 36.2 may also incorporate a plurality of second optical prisms 36, 36.2 abutting one another and constructed of at least two different optical materials, wherein the plurality of second optical prisms 36, 36.2 abutting one another and constructed of the at least two different optical materials provide for at least partially compensating for the chromatic aberration in the image 16.

In accordance with one set of embodiments, the direction/axis of anamorphic magnification 38 is vertical, and the anamorphic magnification provides for an anamorphic compression of the image 16. Furthermore, the at least one first optical prism 36, 36.1 may be located in front of the at least one second optical prism 36, 36.2 relative to a propagation of the light through the anamorphic optical system 10, 10.1, 10.2, with the first apex 46.1 relatively closer to the second base boundary 48.2 than the first base boundary 48.1 is to the second apex 46.2. Yet further, a) the first apex 46.1 may be located above the second apex 46.2 so as to provide for projecting the image 16 from a relatively higher location and for forming the anamorphically magnified image 16 at a relatively lower location, or b) the first apex 46.1 may be located below the second apex 46.2 so as to provide for projecting the image 16 from a relatively lower location and for forming the anamorphically magnified image 16 at a relatively higher location.

An image projection system 12, 12.1, 12.2, 12.3 incorporating the anamorphic optical system 10 may further comprise a projection screen 22, wherein the projection screen 22 is displaced from the at least one refractive or diffractive element of the optical corrector 34, the at least one first optical prism 36.1 and the at least one second optical prism 36.2, and the projection screen 22 provides for receiving an anamorphically magnified image 16, 16' focused thereupon.

FIGS. 7 through 14c illustrate the results of computer simulation—using Zemax optical-simulation-and-design software—of image projection performance of four different configurations of the second-aspect image projection system 12, 12.2 illustrated in FIGS. 6a-6b in cooperation with either the associated second-aspect anamorphic optical system 10, 10.2, or a sub-combination thereof, with the anamorphic optical system 10 located 5.79 meters (19 feet) from the associated projection screen 22, and with the projection lens 28 located 5.868 meters from the projection screen 22, which is representative of an average residential theater. More particularly, for each set of simulation results, the particular configuration is simulated for a set of eight representative point sources 84 at locations A-H in object space 86 as illustrated in FIG. 7 and tabulated in FIGS. 9a-9d, wherein the object space 86 is coincident with the location within the image projector 24, 24' of the source of the projected image 16, and the associated X and Y coordinate locations are listed in FIGS. 9a-9d under the heading "Object Space" of the associated pixels being illuminated within a rectangular panel of pixels of the image projector 24, 24' that are illuminated by the associated beams of light 26, from which the associated projected image 16 is projected through an associated ideal projection lens 28 and then onto and through the associated anamorphic optical subsystem 32, 32'. From each point source 84 of infinitesimal lateral extent, the optical-simulation-and-design software projects through the second-aspect image projection system 12, 12.2 a plurality of rays, each ray in a different direction of an associated uniform angular sampling distribution, that generate a corresponding spot image A'-H' in an associated image space 88, wherein the corresponding locations in image space of the centroid of the associated spot image A'-H' are tabulated in FIGS. 9a-9d, and illustrated in FIG. 8 for the configuration associated with FIG. 13c, wherein the spot images A'-H' in the image space 88 are in one-to-one correspondence with the corresponding point sources 84 at the corresponding associated locations A-H in object space 86.

The second-aspect anamorphic optical system 10, 10.2 that was simulated provided for compressing the vertical height of the projected image 16 by 75 percent, resulting in a magnification of the aspect ratio (i.e. width/height) by a factor of 4/3, as can be seen by comparing the image space 88 illustrated in FIG. 8 with the object space 86 illustrated in FIG. 7, or more particularly, comparing the aspect ratio of a rectangle with corner points E, G in object space 86 with a corresponding rectangle with corner points E', G' in the image space 88.

Figure 11A:
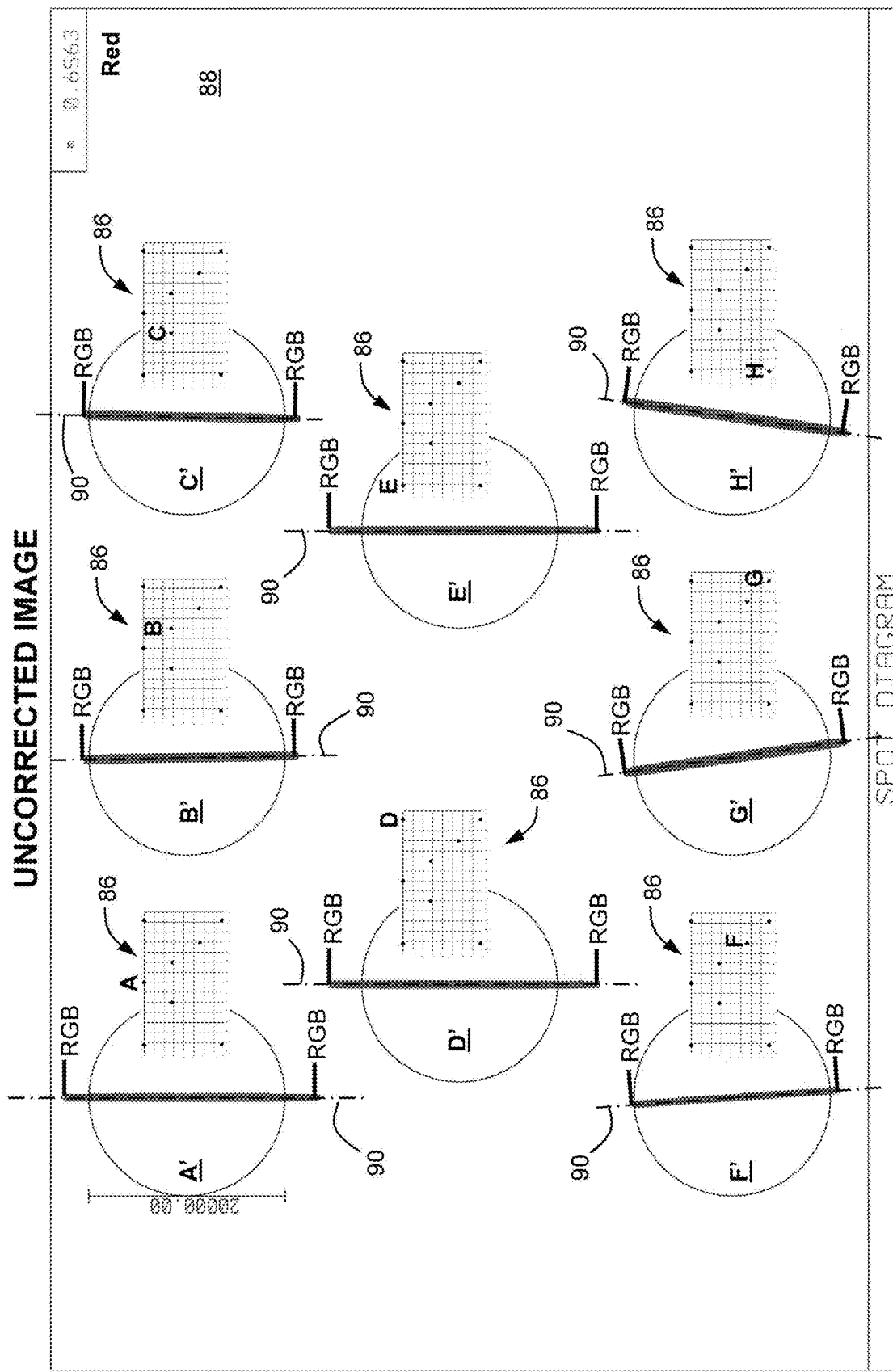
Figure 11B:
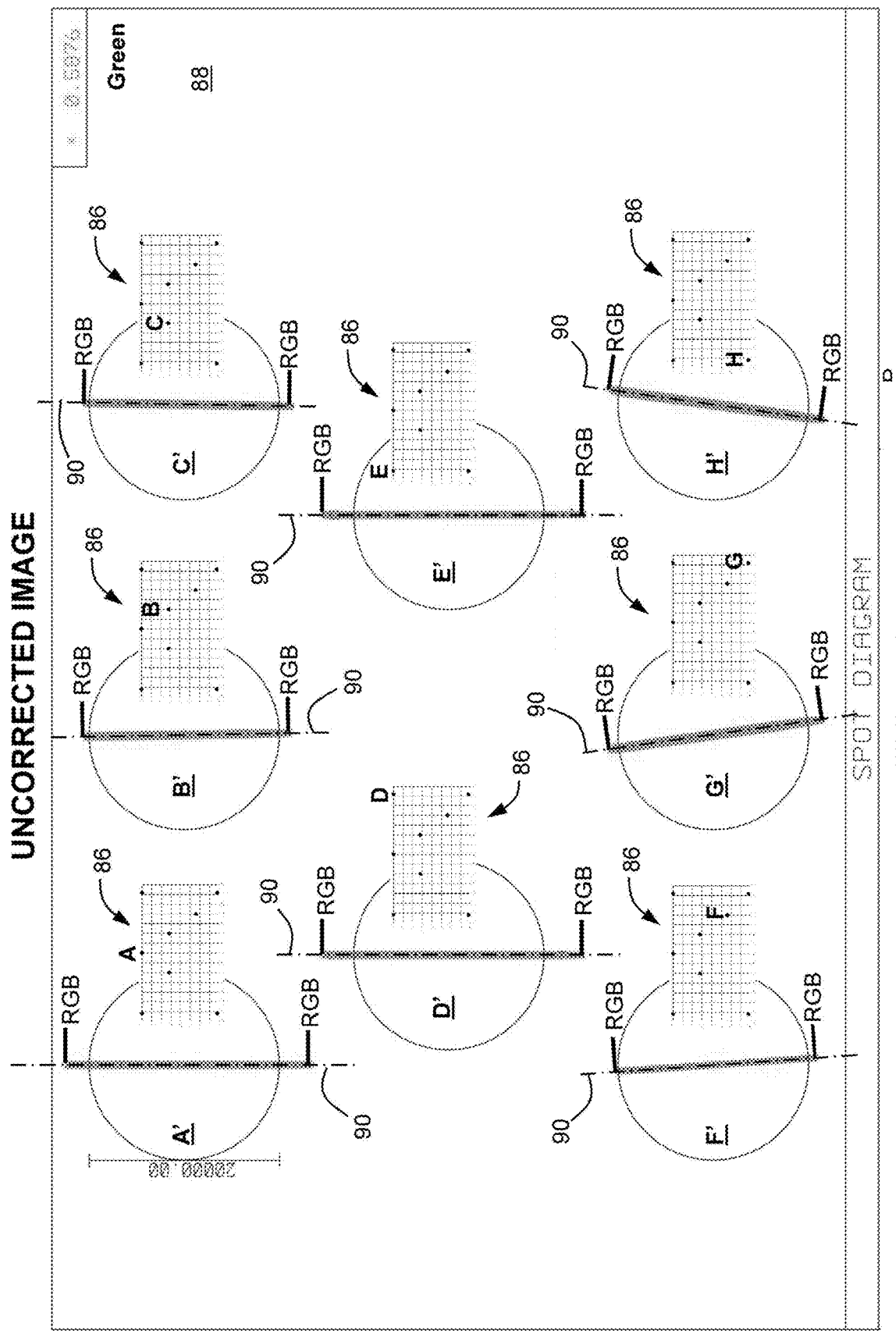
Figure 11C:
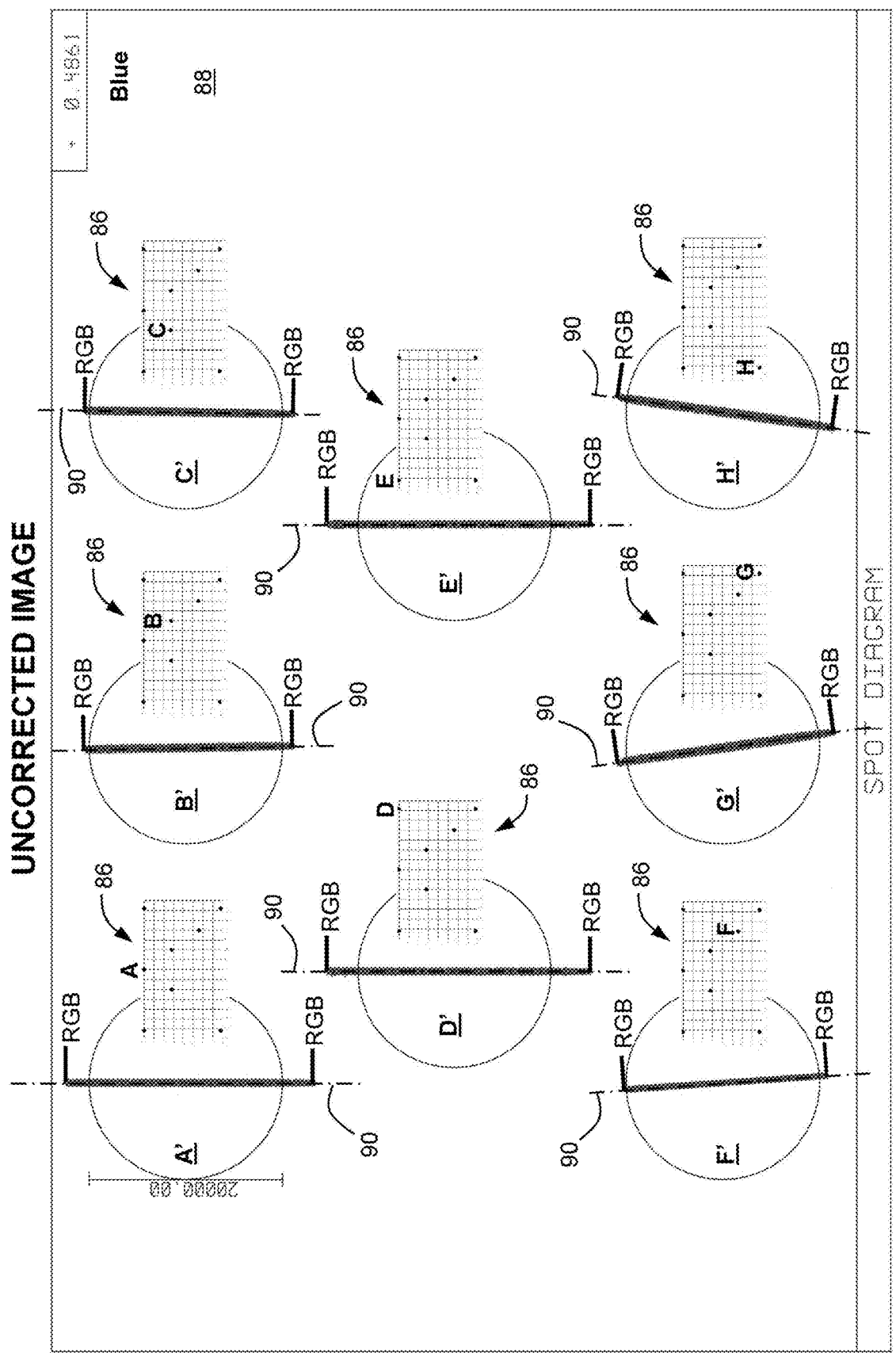

Referring to FIGS. 7, 8, 9a, and 11a-11c, the optical simulation results are provided for a first configuration of the second-aspect image projection system 12, 12.2 incorporating a sub-combination of the second-aspect anamorphic optical system 10, 10.2 that does not incorporate the associated corrector optics 34, resulting in a corresponding set of uncorrected spot images A'-H' in the associated image space 88 for each of three primary colors, red (0.6563 microns), green (0.5876 microns) and blue (0.4861 microns)—respectively illustrated in the corresponding spot diagrams of FIGS. 11a-11c. Each spot diagram contains a composite of images of all of the point sources 84 for all of the locations A-H in object space 86 that are illustrated in FIG. 7 and tabulated in FIG. 9a. FIGS. 11a-11c illustrate the astigmatism caused by the first 36.1 and second 36.2 optical prisms of the second-aspect anamorphic optical system 10, 10.2, which manifests as an elongation of the associated spot image A'-H' because the light 14' forming that spot image A'-H' is focused along a first dimension within a first principal astigmatic focal plane at a first axial location along the associated beam of light 26, and is focused along a second, relatively orthogonal dimension within a second principle astigmatic focal plane at a second axial location along the associated beam of light 26, wherein the first and second principal astigmatic focal planes are displaced from one another along the associated optic axis 20 of the image projection system 12, and the images of FIGS. 11a-11c are illustrated at one of two principal astigmatic focal planes. Accordingly, the presence of astigmatism in an image projection system will prevent an image of a spot—for example, a spot associated with a pixel in object space 86—from coming into complete focus in the associated image space 88, but is either focused in one of the two principal astigmatic focal planes and blurred and elongated in the other, or vice versa, or between the two principal astigmatic focal planes, relatively more uniformly blurred to form a classic "circle of least confusion", wherein the blurring occurs along a first principal axis 90 associated with the first principal astigmatic focal plane. The rotation of the first principal axis 90 of some of the spot images A'-H', e.g. F', G' and H', is a due to those regions being sufficiently displaced along the optic axis 20 of the image projection system 12 so that the optical medium 44 of the second-aspect anamorphic optical system 10, 10.2 does not have a unidirectional influence on the associated beams of light 26 passing therethrough. For each associated spot diagram, FIGS. 11a-11c include indicators of the approximate extent of the blurred spot image A'-H' along the associated first principal axis 90, which are labeled as follows: a) with "R" to indicate the extent of the red spot images A'-H' from FIG. 11a; a) with "G" to indicate the extent of the green spot images A'-H' from FIG. 11b; and c) with "B" to indicate the extent of the blue spot images A'-H' from FIG. 11c, wherein for the first configuration of the second-aspect image projection system 12, 12.2 incorporating a sub-combination of the second-aspect anamorphic optical system 10, 10.2 that does not incorporate the associated corrector optics 34, the extent of the spot images A'-H' for each of the primary colors is at least approximately the same.

FIG. 9a lists the X and Y locations of the centroids of each of the spot images A'-H', in millimeters, for each of the primary colors, red, green and blue, associated with respective FIGS. 11a, 11b, and 11c, respectively, and, for each spot image A'-H', the average of the X and Y centroidal locations for all of the primary colors. Each spot image A'-H' in FIGS. 11a, 11b, and 11c is illustrated in association with a 20,000 micron diameter circle that provides for a scale reference, and is also illustrated in association with an image of object space 86 for which the location A-H of the associated point source 84 is illustrated with the particular corresponding associated location A-H indicated above the corresponding associated point source 84 in object space 86. For each of the image spaces 88 illustrated in FIGS. 11a, 1b, and 11c, FIG. 9a lists the associated Airy radius, the RMS radius (labeled as "RMS") and the GEO radius (labeled as "GEO") for each of the spot images A'-H', wherein the Airy radius is the actual radius of an image of a point source 84 by an associated ideal optical system with no aberrations other than diffraction; the RMS radius is the root mean square of all sample distances from an associated location of the centroid of the associated spot image A'-H'; and the GEO radius is the radius of a circle—centered about the centroid—that circumscribes the associated spot image A'-H'.

Referring to FIGS. 7, 8, 9b, and 12a-12c, the optical simulation results are provided for a second configuration of the second-aspect image projection system 12, 12.2 incorporating a sub-combination of the second-aspect anamorphic optical system 10, 10.2 that does not incorporate the associated corrector optics 34, but for which the associated projection lens 28 is adjusted for best focus at a plane intermediate to the first and second principal astigmatic focal planes, resulting in a corresponding set of uncorrected, but best focused, spot images A'-H' in the associated image space 88 for each of three primary colors, red (0.6563 microns), green (0.5876 microns) and blue (0.4861 microns)—respectively illustrated in the corresponding spot diagrams of FIGS. 12a-12c, wherein the best focus is obtained by minimizing either the associated RMS radius or the associated peak-to-valley size of the spot image(s) A'-H', or a weighted average of this measure for a plurality of different spot locations, for example, in one set of embodiments, with equal weighting for each of the spots. Each spot diagram contains a composite of images of all of the point sources 84 for all of the locations A-H in object space 86 that are illustrated in FIG. 7 and tabulated in FIG. 9b, the content of the latter of which is similar to that of FIG. 9a, supra, but for the second configuration of the second-aspect image projection system 12, 12.2. As illustrated by a reduction of the RMS and GEO radii listed in FIG. 9b, relative to corresponding values listed in FIG. 9a, the focusing of the projection lens 28 provides for reducing the maximum extent of the spot images A'-H' of the uncorrected image with best focus illustrated in FIGS. 12a-12c relative to the corresponding uncorrected images focused at one of the principal astigmatic focal planes illustrated in FIGS. 11a-11c, wherein the reduction in the maximum extent of each of the spot images A'-H' along the first principal axis 90 is associated with a spread of thereof along a second principal axis orthogonal thereto. For each associated spot diagram, FIGS. 12a-12c include indicators of the approximate extent of the spot image A'-H' along the associated first principal axis 90, which are labeled as follows: a) with "R" to indicate the extent of the red spot images A'-H' from FIG. 12a; a) with "G" to indicate the extent of the green spot images A'-H' from FIG. 12b; and c) with "B" to indicate the extent of the blue spot images A'-H' from FIG. 12c.

Referring to FIGS. 7, 8, 9c, and 13a-13c, the optical simulation results are provided for a third configuration of the second-aspect image projection system 12, 12.2 incorporating the second-aspect anamorphic optical system 10, 10.2 that incorporates associated corrector optics 34 for which the focal length and rotation angle (i.e. tilt angle) thereof are optimized in accordance with the second merit function, supra, to provide for minimizing either the associated RMS radius or the associated peak-to-valley size of the spot image(s) A'-H', resulting in a corresponding set of corrected spot images A'-H' in the associated image space 88 for each of three primary colors, red (0.6563 microns), green (0.5876 microns) and blue (0.4861 microns)—respectively illustrated in the corresponding spot diagrams of FIGS. 13a-13c. Each spot diagram contains a composite of images of all of the point sources 84 for all of the locations A-H in object space 86 that are illustrated in FIG. 7 and tabulated in FIG. 9c, the content of the latter of which is similar to that of FIG. 9a, supra, but for the third configuration of the second-aspect image projection system 12, 12.2. The corrector optics 34 provide for substantially reducing the maximum extent of the spot image A'-H', as illustrated by a reduction of the RMS and GEO radii listed in FIG. 9c, relative to corresponding values listed in either of FIG. 9a or 9b, for example, so that the largest dimension of each color spot does not exceed 300 percent of the smallest dimension, For example, in accordance with a first metric, the corrector optics 34 provide for reducing the maximum extent of at least one spot image A'-H' by more than 50 percent relative to either the first or second configuration of the second-aspect image projection system 12, 12.2 without the corrector optics 34. For each associated spot diagram, FIGS. 13a-13c include indicators of the approximate extent of the spot image A'-H' along the associated first principal axis 90, which are labeled as follows: a) with "R" to indicate the extent of the red spot images A'-H' from FIG. 13a; a) with "G" to indicate the extent of the green spot images A'-H' from FIG. 13b; and c) with "B" to indicate the extent of the blue spot images A'-H' from FIG. 13c.

More particularly, referring to FIG. 10b, for each of the respective primary colors, red, green and blue, the columns labeled "Uncorrected" provide the ratio of the GEO values from table of FIG. 9c divided by the corresponding GEO values from corresponding cells of the table of FIG. 9a, so as to provide the relative size of the corrected spot images A'-H' illustrated in FIGS. 13a-13c, in relation to the size of the uncorrected spot images A'-H' illustrated in FIGS. 11a-11c. Furthermore, the columns labeled "Best Focus" provide the ratio of the GEO values from table of FIG. 9c divided by the corresponding GEO values from corresponding cells of the table of FIG. 9b, so as to provide the relative size of the corrected spot images A'-H' illustrated in FIGS. 13a-13c, in relation to the size of the uncorrected-best-focus spot images A'-H' illustrated in FIGS. 12a-12c. FIG. 10b also lists the maximum of the above ratios for each primary color, and the maximum across all primary colors. Accordingly, the GEO radii sizes of the spot images A'-H' illustrated in FIGS. 13a-13c are less than or equal to 8.9 percent of the GEO radii sizes of the uncorrected images of FIGS. 11a-11c, and are less than or equal to 11.5 percent of the size of the GEO radii sizes of the uncorrected-best-focus images of FIGS. 12a-12c. For purposes of comparison, FIG. 10a provides a table of similar GEO radii size comparisons of the uncorrected-best-focus images of FIGS. 12a-12c in relation to the uncorrected images of FIGS. 11a-11c, which shows that the GEO radii sizes of uncorrected-best-focus images of FIGS. 12a-12c are less than or equal to 85.7 percent of the GEO radii sizes of the uncorrected images of FIGS. 11a-11c.

As another example, in accordance with a second metric, the corrector optics 34 provide for limiting the associated aspect ratio—i.e. the ratio of the size of maximum extent divided by the size of the minimum extent along respective relatively-orthogonal directions—of at least one spot image A'-H' to be less than 300 percent. In accordance with the second merit function, supra, the optical design software provides for minimizing the general spread of rays relative to an associated centroid location so as to create a circle of least confusion so the spot images A'-H' appear as focused as possible. Accordingly, relative to the uncorrected first and second configurations illustrated in FIGS. 9a, 9b, and 11a-12c, the optimized corrector optics 34 having a cylindrical radius of 4.650 meters provide for consolidating each spot image A'-H' to correspondingly substantially-more-localized spots, for example, so that the largest dimension of each color spot does not exceed 300 percent of the smallest dimension, for each respective color. It has been found that the optimal focal length of the corrector optics 34 is responsive to the throw distance of the image projection system 12, i.e. the distance from the image projector 24, 24' to the projection screen 22, but the that optimal angle of the optimized corrector optics 34 is substantially invariant with respect to that distance. For example, from one set of simulations for a particular image field of view and general angle from the image projector 24, 24' to the projection screen 22 as a result of an associated vertical offset distance and an associated throw distance, the optimal angle of the corrector optics 34 was found to be about 28 degrees with respect to the vertical axis.

Accordingly, there is an optimum rotation angle and amount of astigmatism correction of the astigmatism corrector element for producing the minimum aggregate spot size in the resulting image. Such astigmatism correction is responsive to, and compensates for, the astigmatism created by the anamorphic optical system 10 as a result of the focal properties of the beams of light 26 passing through the anamorphic optical subsystem 32, 32' and therefore is responsive to the throw distance between the image projector 24, 24' and the projection screen 22 upon which the beams of light 26 are focused. When using corrector optics 34 for which the associated focal length thereof is optimized for the associated throw distance of the image projection system 12, the associated optimal rotation angle of the corrector optics 34 within the associated anamorphic optical system 10 is relatively invariant with respect to throw distance. Accordingly, in accordance with one set of embodiments, the anamorphic optical system 10 provides for changing (i.e. removing and replacing) the corrector optics 34 so as to provide for removing the corrector optics 34 configured for a first throw distance that is different from the actual throw distance, and then utilizing corrector optics 34 that would be suitable for a different, but actual, second throw distance, without otherwise requiring a change of other optical components of the anamorphic optical system 10.

Referring to FIGS. 7, 8, 9*d*, and 14*a*-14*c*, the optical simulation results are provided for a fourth configuration of the second-aspect image projection system 12, 12.2 incorporating the second-aspect anamorphic optical system 10, 10.2 that incorporates associated corrector optics 34 for which the focal length and rotation angle (i.e. tilt angle) thereof are optimized in accordance with the second merit function, supra, to provide for minimizing, for a first throw distance, either the associated RMS radius or the associated peak-to-valley size of the spot image(s) A'-H', but for which the image projection system 12 is used at a different, second throw distance, resulting in a corresponding set of non-optimally-corrected spot images A'-H' in the associated image space 88 for each of three primary colors, red (0.6563 microns), green (0.5876 microns) and blue (0.4861 microns)—respectively illustrated in the corresponding spot diagrams of FIGS. 14*a*-14*c*. Each spot diagram contains a composite of images of all of the point sources 84 for all of the locations A-H in object space 86 that are illustrated in FIG. 7 and tabulated in FIG. 9*d*, the content of the latter of which is similar to that of FIG. 9*a*, supra, but for the fourth configuration of the second-aspect image projection system 12, 12.2. For each associated spot diagram, FIGS. 14*a*-14*c* include indicators of the approximate extent of the spot image A'-H' along the associated first principal axis 90, which are labeled as follows: a) with "R" to indicate the extent of the red spot images A'-H' from FIG. 14*a*; a) with "G" to indicate the extent of the green spot images A'-H' from FIG. 14*b*; and c) with "B" to indicate the extent of the blue spot images A'-H' from FIG. 14*c*. More particularly, the image projection system 12 was simulated with the anamorphic optical system 10 located at a 5.79 meter (19 feet) throw distance from the associated projection screen 22, and with the projection lens 28 located 5.868 meters from the projection screen 22, i.e. the same as had been used for the third configuration illustrated in FIG. 9*c*, and 13*a*-13*c*, but with the associated anamorphic optical system 10 incorporating corrector optics 34 having a cylindrical radius of 5.839 meters that had been optimized for a 7.32 meter (24 feet) throw distance, with the rotation angle of the corrector optics 34 optimized in accordance with the second merit function to provide for minimizing either the associated RMS radius or the associated peak-to-valley size of the spot image(s) A'-H', resulting in an associated rotation angle of the corrector optics 34 of about 45 degrees with respect to the vertical axis. From a different perspective, the resulting rotation of the corrector optics 34 relative to the corresponding optimal rotation angle (i.e. for the throw distance to which the corrector optics 34 had been optimized), relative to the first optical surface 42.1 of the first optical prism 36, 36.1, was reduced by approximately 10 degrees. Accordingly, the amount of astigmatism correction from such a corrector varies with rotation angle, which can therefore provide for adjustable correction to accommodate a range of throw distances.

The non-optimal-but-rotated corrector optics 34 provide for substantially reducing the maximum extent of the spot image A'-H', as illustrated by a reduction of the RMS and GEO radii listed in FIG. 9*d*, relative to corresponding values listed in either of FIG. 9*a* or 9*b*, for example, so that the largest dimension of each color spot does not exceed 300 percent of the smallest dimension, for each respective color, For example, in accordance with a first metric, the non-optimal-but-rotated corrector optics 34 provide for reducing the maximum extent of at least one spot image A'-H' by more than 50 percent relative to either the first or second configuration of the second-aspect image projection system 12, 12.2 without the corrector optics 34.

More particularly, referring to FIG. 10*c*, for each of the respective primary colors, red, green and blue, the columns labeled "Uncorrected" provide the ratio of the GEO values from table of FIG. 9*d* divided by the corresponding GEO values from corresponding cells of the table of FIG. 9*a*, so as to provide the relative size of the non-optimized-but-rotated-corrector spot images A'-H' illustrated in FIGS. 14*a*-14*c*, in relation to the size of the uncorrected spot images A'-H' illustrated in FIGS. 11*a*-11*c*. Furthermore, the columns labeled "Best Focus" provide the ratio of the GEO values from table of FIG. 9*d* divided by the corresponding GEO values from corresponding cells of the table of FIG. 9*b*, so as to provide the relative size of the non-optimized-but-rotated-corrector spot images A'-H' illustrated in FIGS. 14*a*-14*c*, in relation to the size of the uncorrected-best-focus spot images A'-H' illustrated in FIGS. 12*a*-12*c*. FIG. 10*c* also lists the maximum of the above ratios for each primary color, and the maximum across all primary colors. Accordingly, the GEO radii sizes of the spot images A'-H' illustrated in FIGS. 14*a*-14*c* are less than or equal to 14.4 percent of the GEO radii sizes of the uncorrected images of FIGS. 11*a*-11*c*, and are less than or equal to 22.4 percent of the size of the GEO radii sizes of the uncorrected-best-focus images of FIGS. 12*a*-12*c*.

As another example, in accordance with a second metric, the corrector optics 34 provide for limiting the aspect ratio—i.e. the ratio of the size of maximum extent divided by the size of the minimum extent along respective relatively-orthogonal directions—of at least one spot image A'-H' to be less than 300 percent. In accordance with the second merit function, supra, the optical design software provides for minimizing the general spread of rays relative to an associated centroid location so as to create a circle of least confusion so the spot images A'-H' appear as focused as possible. Accordingly, relative to the uncorrected first and second configurations illustrated in FIGS. 9*a*, 9*b*, and 11*a*-12*c*, the non-optimal-but-rotated corrector optics 34 provide for consolidating each spot image A'-H' to correspondingly substantially-more-localized spots, for example, so that the largest dimension of each color spot does not exceed 300 percent of the smallest dimension, for each respective color.

Accordingly, rotation of the corrector optics 34 of an associated anamorphic optical system 10, away from an associated optimal rotation angle changes the amount of astigmatism correction provided thereby to that anamorphic optical system 10. Generally, decreasing the angle between the corrector optics 34 and the first optical surface 42.1 of the first optical prism 36, 36.1 increases the associated astigmatism correction while increasing that angle decreases the associated astigmatism correction. Accordingly, the variation of astigmatism correction with respect to rotation angle can be utilized to provide for adjusting the amount of astigmatism correction so as to provide for accommodating a particular throw distance. Whereas the astigmatism correction provided by corrector optics 34 that is used at a throw distance that is different from that for which the corrector optics 34 was optimized—but which is rotated relative to a rotation angle that would be optimal for that corrector optics 34 at its design throw distance—is suboptimal relative to that provided by corrector optics 34 that is optimized for the particular throw distance, the resulting correction from such rotatable corrector optics 34 is sufficiently adequate that the simplicity of adjustable correction might be a viable alternative to utilizing replaceable corrector optics 34 at a fixed rotation angle.

In accordance with one aspect, the anamorphic optical system 10 incorporates a rotational-adjustment mechanism to provide for adjusting the rotation angle of the corrector optics 34, and incorporates nominal corrector optics 34 for which the focal length thereof is optimized for a nominal throw distance, for example, with the rotational-adjustment mechanism providing an indication of the rotation relative to a nominal rotation angle associated with the nominal corrector optics 34. Accordingly, with the rotational-adjustment mechanism adjusted to place the nominal corrector optics 34 at the associated nominal rotation angle, the anamorphic optical system 10 in cooperation with the nominal corrector optics 34 would provide for optimal correction astigmatism correction with the image projector 24, 24' at the nominal throw distance from the projection screen 22. With the image projector 24, 24' at a different throw distance, the rotational-adjustment mechanism would be adjusted to position the corrector optics 34 at a different-from-nominal rotation angle, either in accordance with a predetermined calibration—e.g. in accordance with a scale on the housing 30, or of the rotational-adjustment mechanism, calibrated either in absolute throw distance or in differential throw distance relative to nominal, —or responsive to a visual determination by the user of best focus responsive to the perceived quality of the resulting projected image 16.

It should be understood, that any reference herein to the term "or" is intended to mean an "inclusive or" or what is also known as a "logical OR", wherein when used as a logic statement, the expression "A or B" is true if either A or B is true, or if both A and B are true, and when used as a list of elements, the expression "A, B or C" is intended to include all combinations of the elements recited in the expression, for example, any of the elements selected from the group consisting of A, B, C, (A, B), (A, C), (B, C), and (A, B, C); and so on if additional elements are listed. Furthermore, it should also be understood that the indefinite articles "a" or "an", and the corresponding associated definite articles "the" or "said", are each intended to mean one or more unless otherwise stated, implied, or physically impossible. Yet further, it should be understood that the expressions "at least one of A and B, etc.", "at least one of A or B, etc.", "selected from A and B, etc." and "selected from A or B, etc." are each intended to mean either any recited element individually or any combination of two or more elements, for example, any of the elements from the group consisting of "A", "B", and "A AND B together", etc. Yet further, it should be understood that the expressions "one of A and B, etc." and "one of A or B, etc." are each intended to mean any of the recited elements individually alone, for example, either A alone or B alone, etc., but not A AND B together. Furthermore, it should also be understood that unless indicated otherwise or unless physically impossible, that the above-described embodiments and aspects can be used in combination with one another and are not mutually exclusive. Accordingly, the particular arrangements disclosed are meant to be illustrative only and not limiting as to the scope of the invention, which is to be given the full breadth of the appended claims, and any and all equivalents thereof.

What is claimed is:

1. A method of anamorphically magnifying an image, comprising:
  a. projecting light of the image generally along a first axis through an anamorphic optical system, wherein said anamorphic optical system comprises:
    i. at least one first optical prism, wherein said at least one first optical prism comprises:
      a). a first surface;
      b) a second surface, wherein a first plane underlying said first surface intersects with a second plane underlying said second surface, and said first and second planes intersect at a first apex;
      c) a first base boundary, wherein said first surface comprises a first edge that is distal to said first apex, said second surface comprises a second edge that is distal to said first apex, and said first base boundary extends between said first edge and said second edge; and
      d) at least one optical medium between said first surface and said second surface;
    ii. at least one second optical prism, wherein said at least one second optical prism comprises:
      a) a third surface;
      b) a fourth surface, wherein a third plane underlying said third surface intersects with a fourth plane underlying said fourth surface, and said third and fourth planes intersect at a second apex;
      c) a second base boundary, wherein said third surface comprises a third edge that is distal to said second apex, said fourth surface comprises a fourth edge that is distal to said second apex, and said second base boundary extends between said third edge and said fourth edge; and
      d) at least one optical medium between said third surface and said fourth surface, wherein said first and second apexes are substantially parallel with respect to one another, said first and second apexes are each substantially perpendicular to said first axis, said at least one first optical prism and said at least one second optical prism are arranged in a complementary relationship, so that said first apex and said second base boundary are both offset in a first transverse direction relative to said first axis, said second apex and said first base boundary are both offset in a second transverse direction relative to said first axis, said first and second transverse directions are opposite relative to one another, said at least one first optical prism and said at least one second optical prism in combination provide for anamorphic magnification of the light of said image when said light passes through said at least one first optical prism and said at least one second optical prism, a direction of said anamorphic magnification is substantially perpendicular to said first and second apexes, and said at least one first optical prism and said at least one second optical prism in combination generate at least one first aberration in said light of said image;
    iii. an optical corrector comprising at least one refractive or diffractive element, wherein said optical corrector exhibits anamorphic optical power associated with at least one linear axis of cylindrical curvature, each said at least one linear axis of cylindrical curvature is substantially parallel to both said first and second apexes, said optical corrector is rotated relative to said first axis about an axis parallel to said at least one linear axis of cylindrical curvature by a corresponding rotation angle that provides for at least partially compensating for at least one said at least one first aberration responsive to said rotation angle, wherein said optical corrector is off normal relative to said first axis; and b. wherein said anamorphic optical system provides for forming an anamorphically magnified image from said light of said image responsive to the operation of projecting said light through said anamorphic optical system.

2. A method of anamorphically magnifying an image as recited in claim 1, wherein said at least one first aberration comprises astigmatism.

3. A method of anamorphically magnifying an image as recited in claim 1, wherein said rotation angle of said optical corrector is in excess of 10 degrees off normal relative to said first axis.

4. A method of anamorphically magnifying an image as recited in claim 1, wherein said rotation angle of said optical corrector is between 15 degrees off normal relative to said first axis and 15 degrees from said first surface of said at least one first optical prism.

5. A method of anamorphically magnifying an image as recited in claim 1, further comprising adjusting said rotation angle of said optical corrector so as to provide for focusing said anamorphically magnified image.

6. A method of anamorphically magnifying an image as recited in claim 1, wherein said rotation angle of said optical corrector is sufficient to provide for a lateral extent in any one lateral direction of an associated optical impulse response that does not exceed more that 300 percent of a corresponding said lateral extent in any other lateral direction of said associated optical impulse response.

7. A method of anamorphically magnifying an image as recited in claim 1, wherein said rotation angle of said optical corrector is sufficient to provide for reducing a maximum extent of an associated optical impulse response of said anamorphic optical system by at least 50 percent in comparison with said anamorphic optical system for which said optical corrector is excluded.

8. A method of anamorphically magnifying an image as recited in claim 1, wherein said at least one refractive or diffractive element comprises a cylindrical lens.

9. A method of anamorphically magnifying an image as recited in claim 8, wherein said cylindrical lens comprises at least one convex optical surface.

10. A method of anamorphically magnifying an image as recited in claim 9, wherein said cylindrical lens comprises at least one planar optical surface.

11. A method of anamorphically magnifying an image as recited in claim 1, wherein said at least one refractive or diffractive element comprises a curved substrate of optical material that is curved about said at least one linear axis of cylindrical curvature.

12. A method of anamorphically magnifying an image as recited in claim 1, wherein a cylindrical curvature of said optical corrector is configured responsive to a distance over which said image is projected.

13. A method of anamorphically magnifying an image as recited in claim 1, wherein said rotation angle of said optical corrector is configured responsive to at least one measure selected from the group of measures consisting of a distance over which said image is projected, and a cylindrical curvature of said optical corrector.

14. A method of anamorphically magnifying an image as recited in claim 1, further comprising selectively interchanging said optical corrector with a different optical corrector that is configured for a different distance over which said image is projected.

15. A method of anamorphically magnifying an image as recited in claim 1, wherein said at least one first optical prism is located in front of said at least one second optical prism relative to a propagation of said light through said anamorphic optical system, and said optical corrector is located in front of said at least one first optical prism so as to initially receive said light of said image.

16. A method of anamorphically magnifying an image as recited in claim 1, wherein said optical corrector is located between said at least one first optical prism and said at least one second optical prism so as to receive said light of said image from said at least one first optical prism.

17. A method of anamorphically magnifying an image as recited in claim 1, wherein said direction of said anamorphic magnification is vertical, and said anamorphic magnification provides for an anamorphic compression of said image.

18. A method of anamorphically magnifying an image as recited in claim 17, wherein said at least one first optical prism is located in front of said at least one second optical prism relative to a propagation of said light through said anamorphic optical system, and said first apex is relatively closer to said second base boundary than said first base boundary is to said second apex.

19. A method of anamorphically magnifying an image as recited in claim 18, wherein said first apex is above said second apex so as to provide for projecting said image from a relatively higher location and for forming said anamorphically magnified image at a relatively lower location.

20. A method of anamorphically magnifying an image as recited in claim 18, wherein said first apex is below said second apex so as to provide for projecting said image from a relatively lower location and for forming said anamorphically magnified image at a relatively higher location.

21. An anamorphic optical system, comprising:
a. at least one first optical prism, wherein said at least one first optical prism comprises:
  i. a first surface;
  ii. a second surface, wherein a first plane underlying said first surface intersects with a second plane underlying said second surface, and said first and second planes intersect at a first apex;
  iii. a first base boundary, wherein said first surface comprises a first edge that is distal to said first apex, said second surface comprises a second edge that is distal to said first apex, and said first base boundary extends between said first edge and said second edge; and
  iv. at least one optical medium between said first surface and said second surface;
b. at least one second optical prism, wherein said at least one second optical prism comprises:
  i. a third surface;
  ii. a fourth surface, wherein a third plane underlying said third surface intersects with a fourth plane underlying said fourth surface, and said third and fourth planes intersect at a second apex;
  iii. a second base boundary, wherein said third surface comprises a third edge that is distal to said second apex, said fourth surface comprises a fourth edge that is distal to said second apex, and said second base boundary extends between said third edge and said fourth edge; and
  iv. at least one optical medium between said third surface and said fourth surface, wherein said first and second apexes are substantially parallel with respect to one another, said first and second apexes are each substantially perpendicular to a first axis, said at least one first optical prism and said at least one second optical prism are arranged in a complementary relationship, so that said first apex and said second base boundary are both offset in a first transverse direction relative to said first axis, said second apex and said first base boundary are both offset in a second transverse direction relative to said first axis, said first and second transverse directions are opposite relative to one another, said at least one first optical prism and said at least one second optical prism in combination provide for anamorphic magnification of light of an image when said light passes through said at least one first optical prism and said at least one second optical prism, a direction of said anamorphic magnification is substantially perpendicular to said first and second apexes, and said at least one first optical prism and said at least one second optical prism in combination generate at least one first aberration in said light of said image; and c. an optical corrector comprising at least one refractive or diffractive element, wherein said optical corrector exhibits anamorphic optical power associated with at least one linear axis of cylindrical curvature, each said at least one linear axis of cylindrical curvature is substantially parallel to both said first and second apexes, said optical corrector is rotated relative to said first axis about an axis parallel to said at least one linear axis of cylindrical curvature by a corresponding rotation angle that provides for at least partially compensating for at least one said at least one first aberration responsive to said rotation angle, wherein said optical corrector is off normal relative to said first axis.

22. An anamorphic optical system as recited in claim 21, wherein said at least one first aberration comprises astigmatism.

23. An anamorphic optical system as recited in claim 21, wherein said rotation angle of said optical corrector is in excess of 10 degrees off normal relative to said first axis.

24. An anamorphic optical system as recited in claim 21, wherein said rotation angle of said optical corrector is between 15 degrees off normal relative to said first axis and 15 degrees from said first surface of said at least one first optical prism.

25. An anamorphic optical system as recited in claim 21, wherein said rotation angle of said optical corrector is sufficient to provide for a lateral extent in any one lateral direction of an associated optical impulse response that does not exceed more that 300 percent of a corresponding said lateral extent in any other lateral direction of said associated optical impulse response.

26. An anamorphic optical system as recited in claim 21, wherein said rotation angle of said optical corrector is sufficient to provide for reducing a maximum extent of an associated optical impulse response of said anamorphic optical system by at least 50 percent in comparison with said anamorphic optical system for which said optical corrector is excluded.

27. An anamorphic optical system as recited in claim 21, wherein said at least one refractive or diffractive element comprises a cylindrical lens.

28. An anamorphic optical system as recited in claim 27, wherein said cylindrical lens comprises at least one convex optical surface.

29. An anamorphic optical system as recited in claim 28, wherein said cylindrical lens comprises at least one planar optical surface.

30. An anamorphic optical system as recited in claim 21, wherein said at least one refractive or diffractive element comprises a curved substrate of optical material that is curved about said at least one linear axis of cylindrical curvature.

31. An anamorphic optical system as recited in claim 21, wherein a cylindrical curvature of said optical corrector is dependent upon a distance over which said image is projected.

32. An anamorphic optical system as recited in claim 21, wherein said rotation angle of said optical corrector is dependent upon at least one measure selected from the group of measures consisting of a) a distance over which said image is projected, and b) a cylindrical curvature of said optical corrector.

33. An anamorphic optical system as recited in claim 21, wherein said optical corrector is supported by a plurality of guides that provide for setting said rotation angle of said optical corrector and that provide for slidably removing and replacing said optical corrector with a differently configured optical corrector.

34. An anamorphic optical system as recited in claim 21, wherein said at least one first optical prism is located in front of said at least one second optical prism relative to a propagation of said light through said anamorphic optical system, and said optical corrector is located in front of said at least one first optical prism so as to initially receive said light of said image.

35. An anamorphic optical system as recited in claim 21, wherein said optical corrector is located between said at least one first optical prism and said at least one second optical prism so as to receive said light of said image from said at least one first optical prism.

36. An anamorphic optical system as recited in claim 21, wherein said direction of said anamorphic magnification is vertical, and said anamorphic magnification provides for an anamorphic compression of said image.

37. An anamorphic optical system as recited in claim 36, wherein said at least one first optical prism is located in front of said at least one second optical prism relative to a propagation of said light through said anamorphic optical system, and said first apex is relatively closer to said second base boundary than said first base boundary is to said second apex.

38. An anamorphic optical system as recited in claim 37, wherein said first apex is above said second apex so as to provide for projecting said image from a relatively higher location and for forming an anamorphically magnified image at a relatively lower location.

39. An anamorphic optical system as recited in claim 37, wherein said first apex is below said second apex so as to provide for projecting said image from a relatively lower location and for forming an anamorphically magnified image at a relatively higher location.

40. An anamorphic optical system as recited in claim 21, wherein said anamorphic optical system is configured for use in cooperation with an image projector, said image projector provides for generating and projecting said light of said image along said first axis towards said at least one refractive or diffractive element, towards said at least one first optical prism, and towards said at least one second optical prism, and a transverse extent of said light projected by said image projector expands with distance from said image projector.

41. An anamorphic optical system as recited in claim 21, Further comprising a projection screen, wherein said projection screen is displaced from said at least one refractive or diffractive element, said at least one first optical prism and said at least one second optical prism, and said projection screen provides for receiving from said at least one second optical prism an anamorphically magnified said image focused on said projection screen.

42. A method of anamorphically magnifying an image, comprising:
 a. projecting light of the image from an image projector through an anamorphic optical system generally along a first axis, wherein said anamorphic optical system operates on said light to provide anamorphic magnification of said image along or in a direction of a magnification axis of said image, and said anamorphic optical system produces at least one optical aberration in said image; and
 b. passing said light of said image through an optical corrector, wherein said optical corrector incorporates at least one refractive or diffractive element, said optical corrector exhibits anamorphic optical power associated with at least one linear axis of cylindrical curvature so as to provide for at least partially compensating for at least one said at least one optical aberration, said at least one linear axis of cylindrical curvature is substantially perpendicular to said magnification axis, and said optical corrector is rotated relative to said first axis about an axis parallel to said at least one linear axis of cylindrical curvature by a corresponding rotation angle in excess of 10 degrees off normal relative to said first axis.

* * * * *

UNITED STATES PATENT AND TRADEMARK OFFICE
CERTIFICATE OF CORRECTION

| | |
|---|---|
| PATENT NO. | : 12,044,832 B1 |
| APPLICATION NO. | : 17/498684 |
| DATED | : July 23, 2024 |
| INVENTOR(S) | : Shawn L. Kelly |

It is certified that error appears in the above-identified patent and that said Letters Patent is hereby corrected as shown below:

On the Title Page

Page 2, 1$^{st}$ Column, U.S. PATENT DOCUMENTS:
For 3,637,308, "Van Raalte" is replaced with --Van Raalte et al.--.

Page 2, 2$^{nd}$ Column, U.S. PATENT DOCUMENTS:
For 8,585,210, "Cheng" is replaced with --Cheng et al.--.
For 9,891,430, "Hung" is replaced with --Hung et al.--.

In the Specification

Column 2 at Lines 2, 15, 27, and 41-42, ""A" through "H"" is replaced with --"A'" through "H'"--.

Column 11 at Lines 54-55, the paragraph beginning at Line 55 is joined to the paragraph ending at Line 54.

Column 13 at Line 46: The second occurrence of "$\beta_2$" is replaced with --$\theta_2$--.

Column 20 at Line 32, "11a, 1b" is replaced with --11a, 11b--.

Column 21 at Line 42, and Column 24 at Line 1, "FIG. 9a" is replaced with --FIGS. 9a--.

Column 23 at Line 44, "FIG. 9c" is replaced with --FIGS. 9c--.

Signed and Sealed this
Third Day of September, 2024

Katherine Kelly Vidal
*Director of the United States Patent and Trademark Office*